(12) United States Patent
Nakayama

(10) Patent No.: US 8,406,952 B2
(45) Date of Patent: Mar. 26, 2013

(54) ELECTRIC PARKING BRAKE CONTROL SYSTEM AND ELECTRIC PARKING BRAKE CONTROL METHOD

(75) Inventor: Daisuke Nakayama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1470 days.

(21) Appl. No.: 11/905,742

(22) Filed: Oct. 3, 2007

(65) Prior Publication Data

US 2008/0086253 A1 Apr. 10, 2008

(30) Foreign Application Priority Data

Oct. 4, 2006 (JP) ................ P2006-272798

(51) Int. Cl.
*G06F 17/00* (2006.01)
*G06F 19/00* (2006.01)
*B60T 7/12* (2006.01)
*B60T 7/00* (2006.01)
*B60T 8/24* (2006.01)
*B60T 8/60* (2006.01)
*B60K 31/02* (2006.01)

(52) U.S. Cl. .............. 701/36; 701/70; 701/80; 303/191; 303/192; 180/170

(58) Field of Classification Search .................... 701/36, 701/38, 45, 70, 80, 1, 48, 49, 29.1, 32.9, 701/33.1; 303/121, 191, 192, 122, 122.01, 303/122.03, 175; 180/271, 191, 192, 170, 180/197

See application file for complete search history.

(56) References Cited

U.S. PATENT DOCUMENTS

| 4,629,043 A * | 12/1986 | Matsuo et al. ................ 477/184 |
| 6,193,332 B1 * | 2/2001 | Ono ............................. 303/191 |
| 7,226,389 B2 * | 6/2007 | Steen et al. ................... 477/195 |
| 2007/0029876 A1 * | 2/2007 | Makishima et al. .......... 303/191 |

FOREIGN PATENT DOCUMENTS

JP 2004-142517 5/2004

* cited by examiner

Primary Examiner — Thomas Tarcza
Assistant Examiner — Edward Pipala
(74) Attorney, Agent, or Firm — McGinn IP Law Group, PLLC

(57) ABSTRACT

In an electric parking brake control apparatus for controlling an electric actuator for driving parking brakes, a dynamically estimated road surface inclination is estimated based on a running state of a vehicle while the vehicle is running, and a statically estimated road surface inclination is estimated based on an acceleration acting on the vehicle after the vehicle is stopped. In the event that the statically estimated road surface inclination is larger than the dynamically estimated road surface inclination after the vehicle is stopped, a braking force of the parking brakes is increased to be larger than a braking force that is set based on the dynamically estimated road surface inclination.

20 Claims, 14 Drawing Sheets

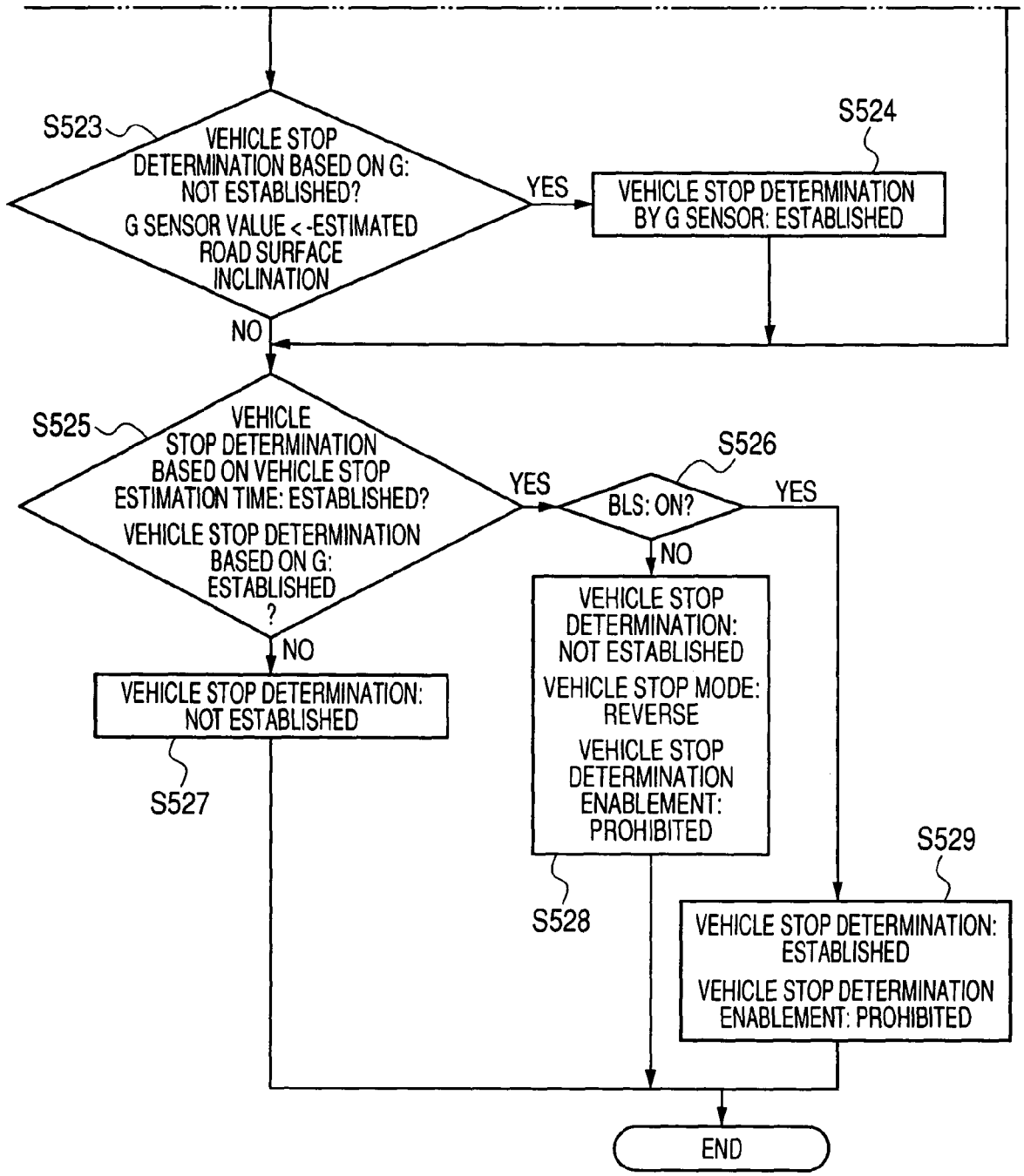

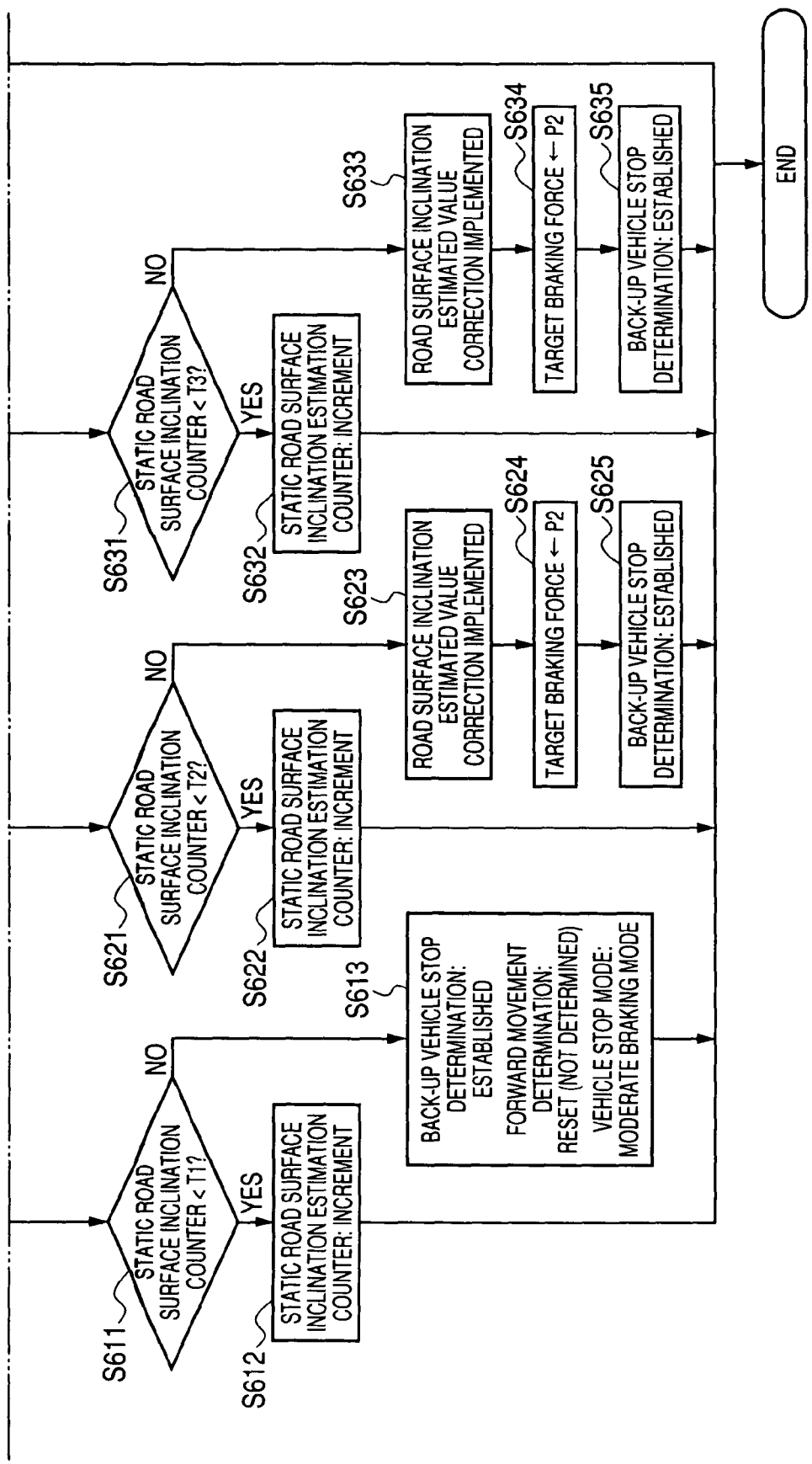

னLECTRIC PARKING BRAKE CONTROL SYSTEM AND ELECTRIC PARKING BRAKE CONTROL METHOD

This application claims foreign priority from Japanese Patent Application No. 2006-272798 filed on Oct. 4, 2006, the entire contents of which are hereby incorporated by reference.

BACKGROUND OF THE INVENTION

1. Field of the Invention

The present invention relates to a control system and method for an electric parking brake which is provided on a vehicle such as an automobile and which includes a hill hold function to increase the braking force thereof when the vehicle is stopped on a slope.

2. Related Art

An electric parking brake drives a parking brake for holding a vehicle when it is parked or stopped by using an electric actuator such as a motor.

Since the electric parking brake can be controlled by the driver who controls an electric switch, labor involved in operating the parking brakes can be reduced compared with a hand-operated lever or foot-operated pedal which is generally used.

In addition, in the electric parking brake, the addition of a "hill hold (hill holder)" function has been proposed. This hill hold function is a function to prevent a vehicle from starting to unintentionally move by automatically activating the electric parking brake when the vehicle is stopped on a slope.

Conventionally, as an electric parking brake system, there has been known an electric parking brake system in which when a road surface inclination detected by an inclination sensor (a G sensor) after a vehicle has been stopped on a road surface is larger than a predetermined road surface inclination, a target braking force is calculated based on the road surface inclination, so as to automatically activate electric barking brakes to operate with the target braking force so calculated.

In addition, in the event that a movement of the vehicle is detected by wheel speed sensors after the automatic operation of the brakes, the braking force is automatically increased (the brakes are automatically reapplied). (For example, refer to JP-A-2004-142517)

However, as is described in JP-A-2004-142517, since a predetermined period of time is necessary to accurately calculate a road surface inclination after the vehicle is stopped, it is not possible to prevent the vehicle from starting to move immediately after the vehicle is stopped. To describe this point in greater detail, since there is generated a change in behavior of the vehicle in a pitching direction due to reaction forces of suspensions when the vehicle is stopped, when attempting to calculate a longitudinal acceleration or a road surface inclination at this timing, an error attributed to pitching is generated, whereby an accurate calculation of a road surface inclination becomes impossible. Because of this, it has been an accepted practice to calculate a road surface inclination after a predetermined time period has elapsed since the vehicle was stopped.

SUMMARY OF THE INVENTION

One or more embodiments of the invention provide an electric parking brake control system which can activate an electric parking brake to operate with a braking force which meets an inclination of a road surface or slope on which the vehicle is stopped immediately after the vehicle is so stopped and which can prevent the vehicle from starting to move on the slope in an ensured fashion.

According to a first aspect of the invention, there is provided an electric parking brake control system for controlling an electric actuator for driving a parking brake, wherein a dynamically estimated road surface inclination that is estimated based on a running state of a vehicle while the vehicle is running and a statically estimated road surface inclination that is estimated based on an acceleration acting on the vehicle after the vehicle is stopped are obtained, respectively, and wherein in the event that the statically estimated road surface inclination is larger than the dynamically estimated road surface inclination after the vehicle is stopped, a braking force of the parking brake is increased to be larger than a braking force that is set based on the dynamically estimated road surface inclination.

According to a second aspect of the invention, there is provided an electric parking brake control system for controlling an electric actuator for driving a parking brake, wherein a dynamically estimated road surface inclination that was estimated based on a running state of a vehicle while the vehicle was running, a dynamically estimated target braking force that is a target braking force after the vehicle is stopped which was obtained based on the dynamically estimated road surface inclination, a statically estimated road surface inclination that was estimated based on an acceleration acting on the vehicle after the vehicle was stopped, and a statically estimated target braking force that is a target braking force after the vehicle is stopped which was obtained based on the statically estimated road surface inclination are obtained, respectively, and wherein in the event that the statically estimated target braking force is larger than the dynamically estimated target braking force after the vehicle is stopped, a braking force of the parking brake is increased to be larger than the dynamically estimated target braking force.

According to a third aspect of the invention, there is provided an electric parking brake control system as set forth in the first or second aspect of the invention, wherein the statically estimated road surface inclination is estimated based on an acceleration which acts on the vehicle after the behavior of the vehicle in a pitching direction has converged.

According to a fourth aspect of the invention, there is provided an electric parking brake control system as set forth in any of the first to third aspects of the invention, wherein the dynamically estimated road surface inclination is estimated by comparing a change in speed of the vehicle and an acceleration which acts on the vehicle.

According to the embodiments of the invention, the following advantages can be obtained.

(1) A dynamically estimated road surface inclination which was estimated while the vehicle was running or a dynamically estimated target braking force after the vehicle is brought to a stop, which was obtained based on the dynamically estimated road surface inclination and a statically estimated road surface inclination that was estimated based on an acceleration after the vehicle was brought to a stop or a statically estimated target braking force which is a target braking force after the vehicle is brought to a stop that was which obtained based on the statically estimated road surface inclination are obtained, respectively, and in the event that the statically estimated road surface inclination is larger than the dynamically estimated road surface inclination or in the event that the statically estimated target braking force is larger than the dynamically estimated target braking force, by increasing the braking force to be greater than the braking force that is set based on the dynamically estimated road surface inclination (the dynamically estimated target braking force), the electric parking brake can be activated immediately after the vehicle is stopped on a slope based on the dynamically estimated road surface inclination that was calculated while the vehicle was running.

In addition, even in the event that there occurs an error in estimating the dynamically estimated road surface inclination, resulting in the fact that the estimated road surface inclination is smaller than an actual road surface inclination, when the statically estimated road surface inclination that was estimated after the vehicle was brought to a stop is larger than the dynamically estimated road surface inclination or when the statically estimated target braking force is larger than the dynamically estimated target braking force, by increasing the braking force to be greater than the braking force that is set based on the dynamically estimated road surface inclination, the vehicle can be prevented from starting to move in an ensured fashion.

In addition, since the statically estimated road surface inclination is estimated based on the acceleration, the braking force can be increased at an earlier timing than a timing at which the vehicle actually starts to move.

(2) The generation of an error attributed to pitching in the statically estimated road surface inclination can be prevented by estimating the statically estimated road surface inclination based on the acceleration resulting after the behavior of the vehicle in the pitching direction has converged.

In addition, since pitching like this converges within a short period of time after the vehicle is brought to a stop, the statically estimated road surface inclination can be estimated immediately.

In accordance with the embodiments of the invention, an electric parking brake control system which can activate the electric parking brake immediately after the vehicle is brought to a stop and which can prevent the vehicle from starting to move is provided by correcting the estimated road surface inclination that was estimated based on the vehicle speed change and acceleration while the vehicle was running according to an output from the G sensor after the vehicle is brought to a stop, so as to set a target braking force for the parking brakes according to the estimated road surface inclination so corrected.

Other aspects and advantages of the invention will be apparent from the following description and the appended claims.

DETAILED DESCRIPTION OF EXEMPLARY EMBODIMENTS

Embodiment 1

Hereinafter, Embodiment 1 of an electric parking brake system will be described as a first exemplary embodiment of an electric parking brake control system of the invention.

Figure 1:
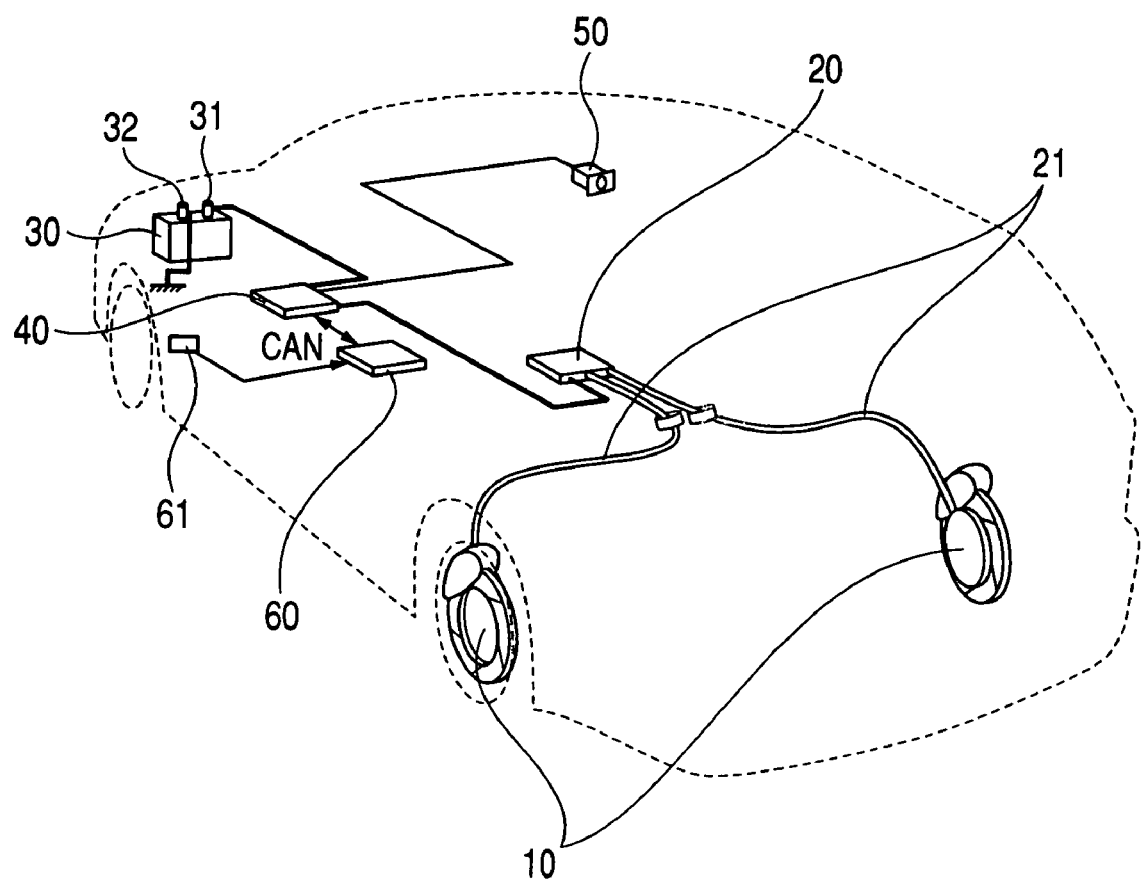
FIG. 1 A diagram showing a mechanical configuration of an electric parking brake system of Embodiment 1 which incorporates therein an electric parking brake control system to which the invention is applied.

FIG. 1 is a diagram showing a mechanical configuration of an electric parking brake system of Embodiment 1.

Figure 2:
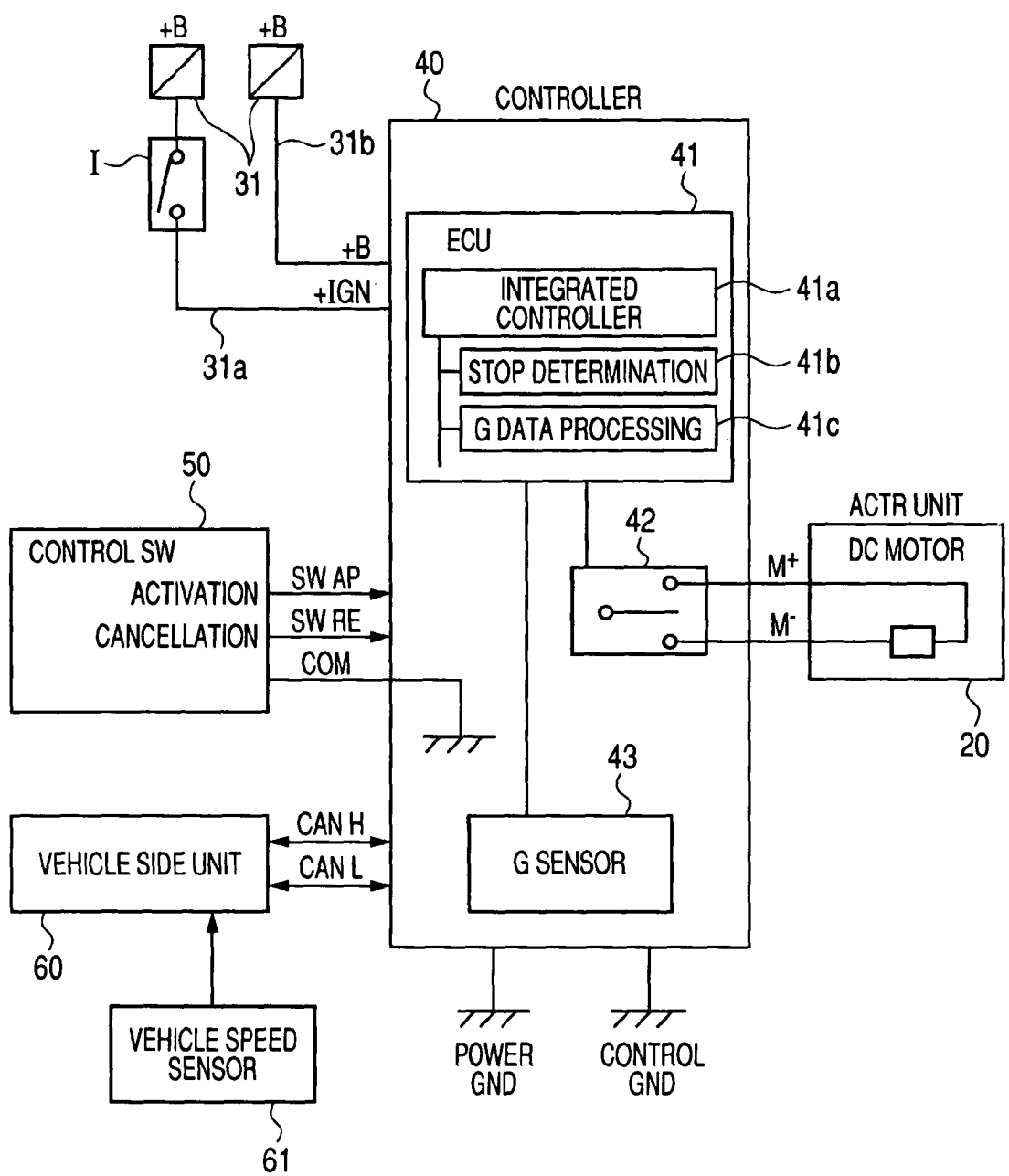
FIG. 2 A block diagram showing a circuit configuration of the electric parking brake system in FIG. 1.

FIG. 2 is a block diagram showing a circuit configuration of the electric parking brake system.

In Embodiment 1, a vehicle is, for example, a motor vehicle such as a passenger car, which is fitted with an automatic transmission which incorporates therein a torque converter and a planetary gear train.

The electric parking brake system includes parking brakes 10, an actuator unit 20, a battery 30, a controller 40, a control switch 50 and a vehicle side unit 60.

The parking brakes 10 are each, a brake device for preventing the movement of the vehicle by braking wheels of the vehicle, for example, when it is parked or stopped and are provided on wheel hub portions of left and right rear wheels, respectively.

The parking brake 10 is of a so-called drum-in-disc type which includes a brake drum, not shown, which is disposed on an inside diameter side of a rotor of a disc brake that is used as a foot brake (a service brake) and a brake shoe, not shown, which is pressed to be brought into contact with an inside diameter side of the brake drum when the brake is applied.

The actuator unit 20 is such as to drive the brake shoe of the parking brake 10 so as to shift it between a braking state in which the parking brake 10 generates a braking force and a released state where the parking brake 10 generates substantially no braking force. The actuator unit 20 includes parking brake cables 21 and is fixed to, for example, a floor panel portion of the vehicle.

The actuator unit 20 is such that a rotational force of, for example, a DC motor is reduced by a reduction gear train so as to rotate a lead screw, whereby the parking brake cables 21 are pulled or loosened by an equalizer which is thread connected to the lead screw.

The parking brake cables 21 are provided in such a manner as to correspond to the left and right parking brakes 10, respectively, and each have flexibility so that the cables can be deformed according to strokes of rear suspensions, not shown. The parking brake cables 21 are made up of Bowden cables which put the parking brakes 10 into the braking state when pulled and put the parking brakes 10 into the released state when loosened.

Here, the actuator 20 has a function to change the braking forces of the parking brakes 10 which are in the braking state by adjusting the pulling force exerted on the parking brake cables 21. The adjustment of the pulling force is implemented by changing a stroke along which the parking brake cables 21 are pulled, and to make this happen, the actuator 20 includes a stroke sensor, not shown, for detecting a pulling stroke.

The battery 30 is a secondary battery that is used as a main power supply for an electrical system of the vehicle and is such as to generate a terminal voltage of, for example, direct current 12V. The battery 30 includes a positive terminal 31 and a negative terminal 32.

The positive terminal 31 is connected to respective pieces of electrical equipment such as the controller 40 via a wiring (harness). As is shown in FIG. 2, the wiring that supplies electric power from this positive terminal 31 to the controller 40 has an ignition wiring 31a and a normally connected wiring 31b. An ignition relay I, which is switched between energization and interruption in conjunction with switching on and off an ignition switch, not shown, is inserted in an intermediate portion along the length of the ignition wiring 31a, so as to be energized when an engine, not shown, which is a power source for driving the vehicle, is on (running). In addition, the normally connected wiring 31b is normally energized irrespective of the state of the ignition switch, so as to be used for holding various types of data in an ECU 41 of the controller 40.

In addition, the negative terminal 32 is grounded to a metallic portion of a vehicle body.

The controller 40 constitutes an electric parking brake control system for controlling the actuator unit 20 so as to change the pulling force of the parking brake cables 21 to thereby switch the parking brakes 10 between the released state and the braking state and changing the braking force of the parking brakes 10 and includes the ECU 41, a relay 42 and a G sensor 43.

The ECU 41 includes a CPU for determining whether or not the parking brakes 10 need to be applied in response to inputs from the control switch 50, the vehicle side unit 60 and performing a reapplication control in which the braking force of the parking brakes 10 is increased when the vehicle is stopped on a slope or the like. The ECU 41 includes an integrated controller 41a, a stop determination unit 41b and an acceleration data processing unit (an inclination determination unit) 41c.

The integrated controller 41a is such as to control the stop determination unit 41b and the acceleration data processing unit 41c and the like in a supervisory fashion.

The stop determination unit 41b is such as to perform a vehicle stop determination operation, which will be described later.

The acceleration data processing unit 41c is such as to process an output from the G sensor 43 to provide the processed output to the stop determination unit 41b, as well as estimate a road surface inclination based on the output of the G sensor 43.

The relay 42 is such as to supply driving electric power to the actuator 20 in response to a control signal outputted from the ECU 41, includes a function to reverse the polarity of driving electric power for shifting the parking brakes 10 from the braking state to the relaxed state and shifting the parking brakes 10 from the relaxed state to the braking state and is adapted to stay in a neutral state in which the energization with the actuator 20 is interrupted when the actuator 20 is in any other states than a state where it is being driven.

The G sensor 43 is such as to include an acceleration sensor for detecting actual acceleration which acts in a longitudinal direction of the vehicle and to input its output into the acceleration data processing unit 41c of the ECU 41.

In addition, in this specification, the polarity of acceleration acting in the longitudinal direction of the vehicle will be described as a deceleration side being positive and an acceleration side being negative.

The control switch 50 is a control portion from which control operations such as a selection of the braking state or relaxed state of the parking brakes 10 and a reapplication of the parking brakes 10 are manually inputted by the user such as the driver and includes a push button or the like which is mounted, for example, on an instrument panel, not shown, of the vehicle. The control switch 50 transmits what has been inputted therethrough to the ECU 41 of the controller 40, and the controller 40 then supplies the driving electric power to the actuator unit 20 in response to the input so made into the ECU 41, so as to drive the parking brakes 10.

The vehicle side unit 60 includes, for example, an engine control unit (ECU) for controlling the engine of the vehicle, a transmission control unit (TCU) for controlling a transmission (gearbox), a driving stability control unit for performing a driving stability control of the vehicle including an ABS control and a vehicle integrated unit for controlling other electrical equipment of the vehicle in a supervisory fashion and is made to communicate with the controller 40 and a CAN communication system which is a type of an onboard LAN. In addition, the vehicle side unit 60 includes vehicle speed sensors 61.

The vehicle speed sensors 61 are provided, for example, in wheel hub portions, respectively, so as to output vehicle speed pulse signals according to rotational speeds of tone wheels which rotate together with the road wheels to thereby be used to detect a running speed (vehicle body speed) of the vehicle. Here, a detectable lower limit speed of the vehicle speed sensor 61 is, for example, on the order of about 2 km/h, and the vehicle speed sensor 61 generates a vehicle speed pulse signal which corresponds to the vehicle speed in speeds which are equal to or faster than the detectable lower limit speed.

The vehicle side unit 60 sequentially provides the controller 40 with information such as engine revolution speed, throttle opening or position, shift position of the transmission, operating condition of the foot or service brake, the speed of the vehicle (vehicle speed) and the like. In an automatic operation mode, in the event that the controller 40 determines that the vehicle has been shifted from a stopped state to a running state based on the pieces of information so inputted thereinto, the controller 40 shifts the parking brakes 10 from the braking state to the released state.

On the other hand, in the event that the controller 40 determines that the vehicle has been shifted from the running state to the stopped state (stop determination), judging that the parking brakes 10 need to be applied, the controller 40 supplies the actuator unit 20 with driving electric power, so as to shift the parking brakes 10 from the released state to the braking state.

Next, the operation of a hill hold function of the electric parking brake system of Embodiment 1 will be described.

Figure 3:
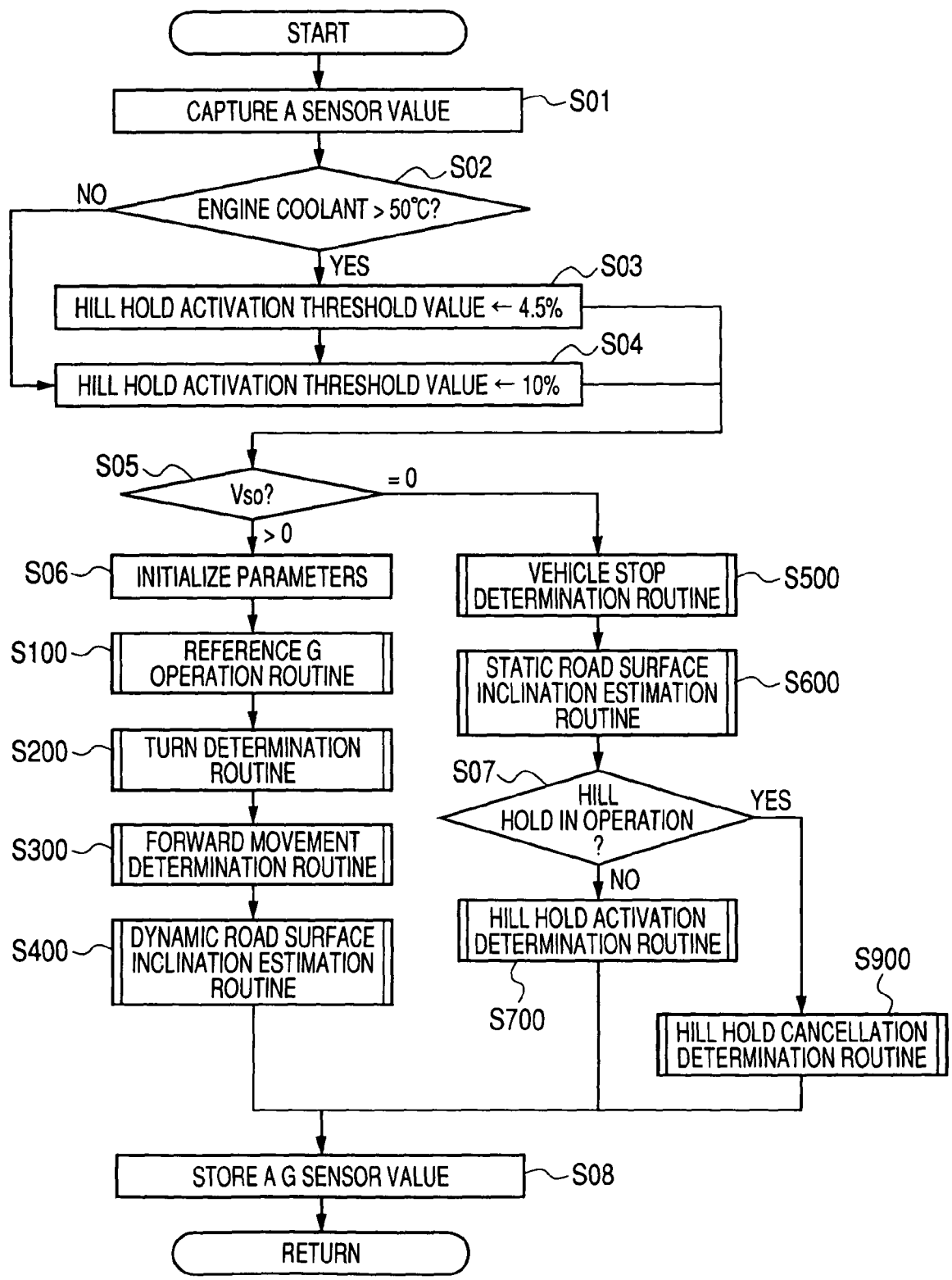
FIG. 3 A flowchart showing a main routine of a hill hold function in the electric parking brake system in FIG. 1.

FIG. 3 is a flowchart showing a main routine of the hill hold function.

Figure 4:
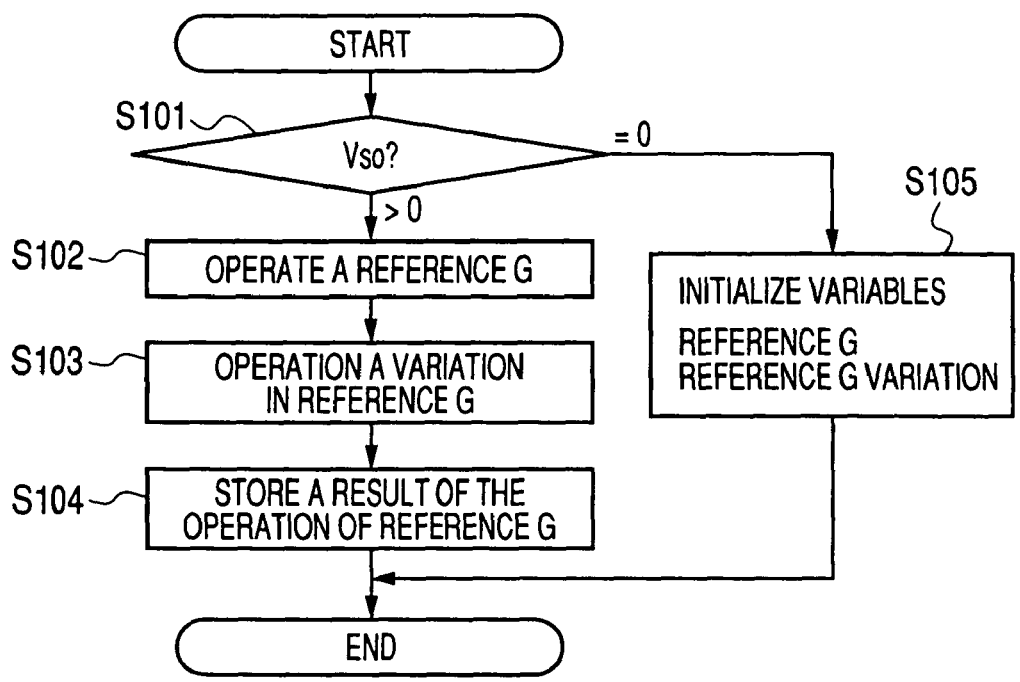
FIG. 4 A flowchart showing a reference G operation routine in the hill hold function in FIG. 3.

FIG. 4 is a flowchart showing a reference G operation routine in the hill hold function.

Figure 5:
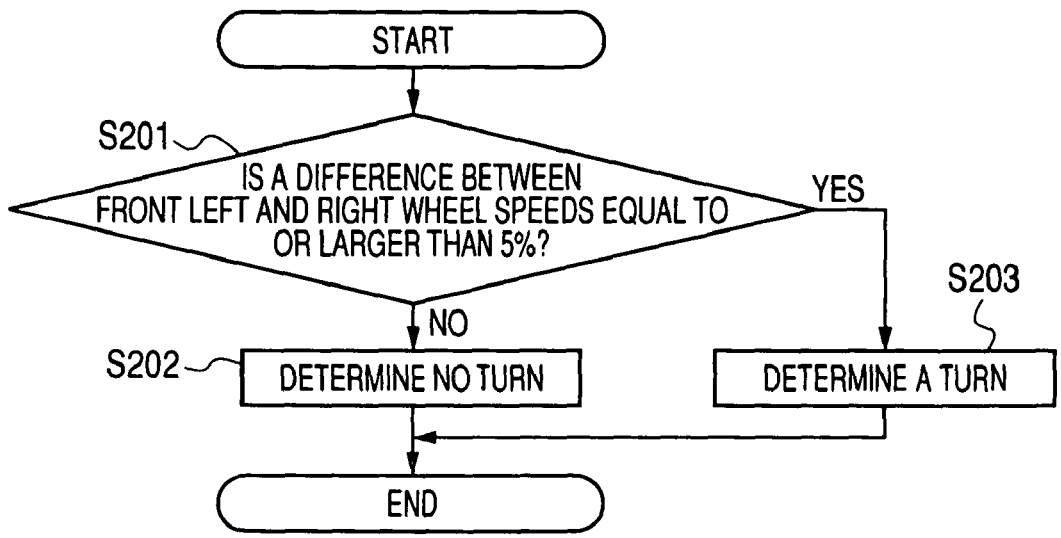
FIG. 5 A flowchart showing a turn determination routine in the hill hold function in FIG. 3.

FIG. 5 is a flowchart showing a turn determination routine in the hill hold function.

Figure 6:
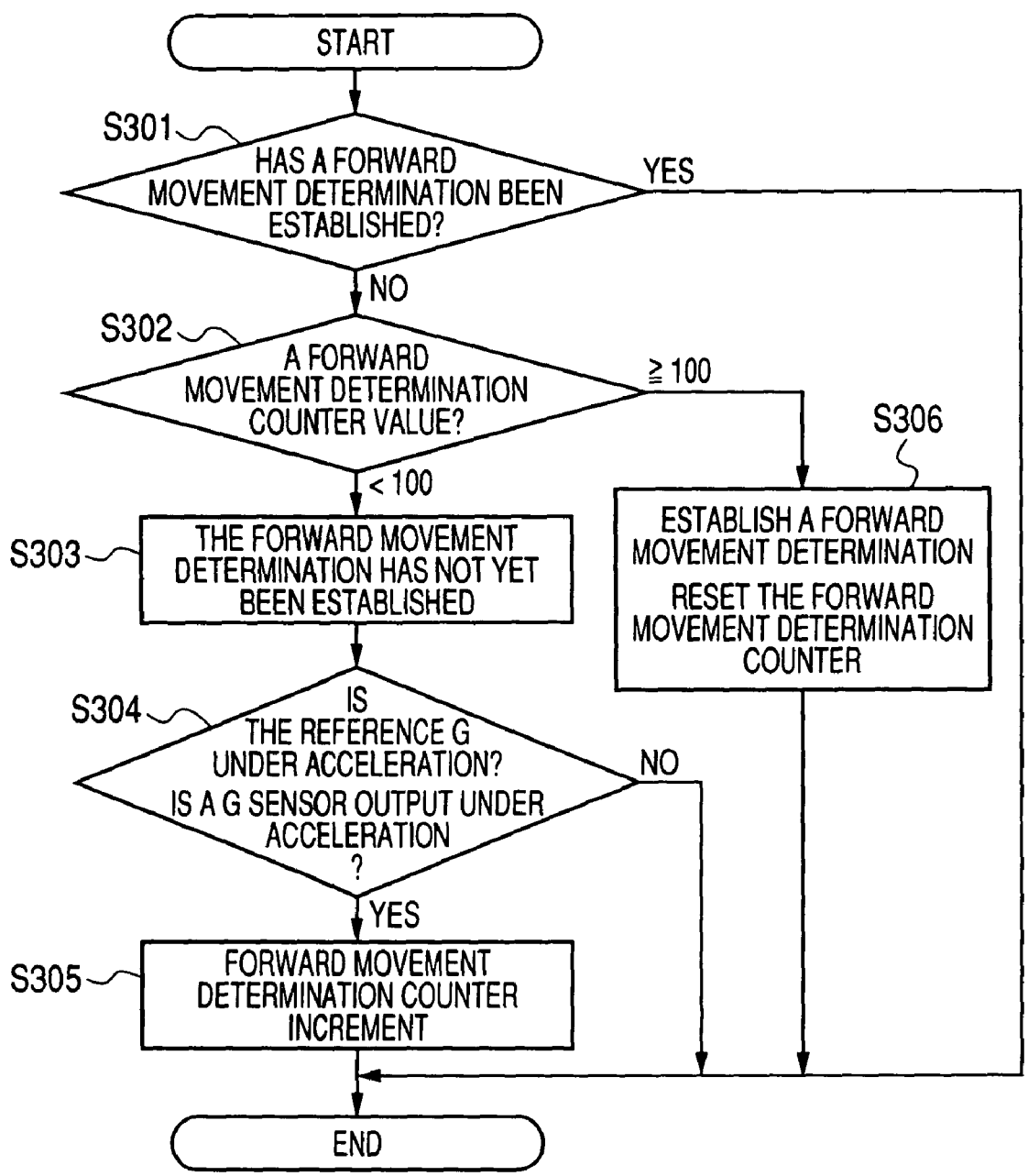
FIG. 6 A flowchart showing a forward movement determination routine in the hill hold function in FIG. 3.

FIG. 6 is a flowchart showing a forward movement determination routine in the hill hold function.

Figure 7:
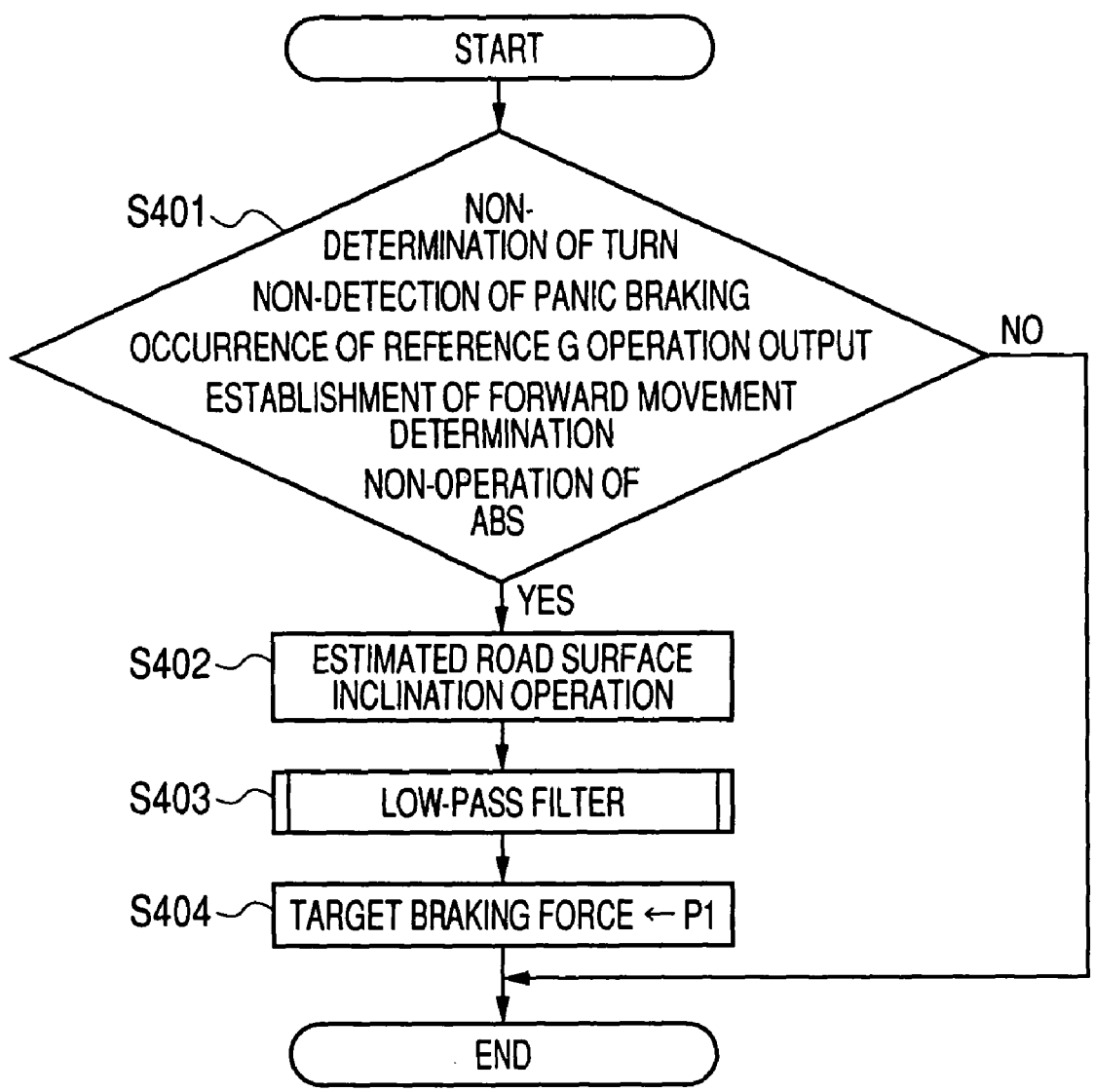
FIG. 7 A flowchart showing a dynamic road surface inclination estimation routine in the hill hold function in FIG. 3.

FIG. 7 is a flowchart showing a dynamic road surface inclination estimation routine in the hill hold function.

Figure 8:
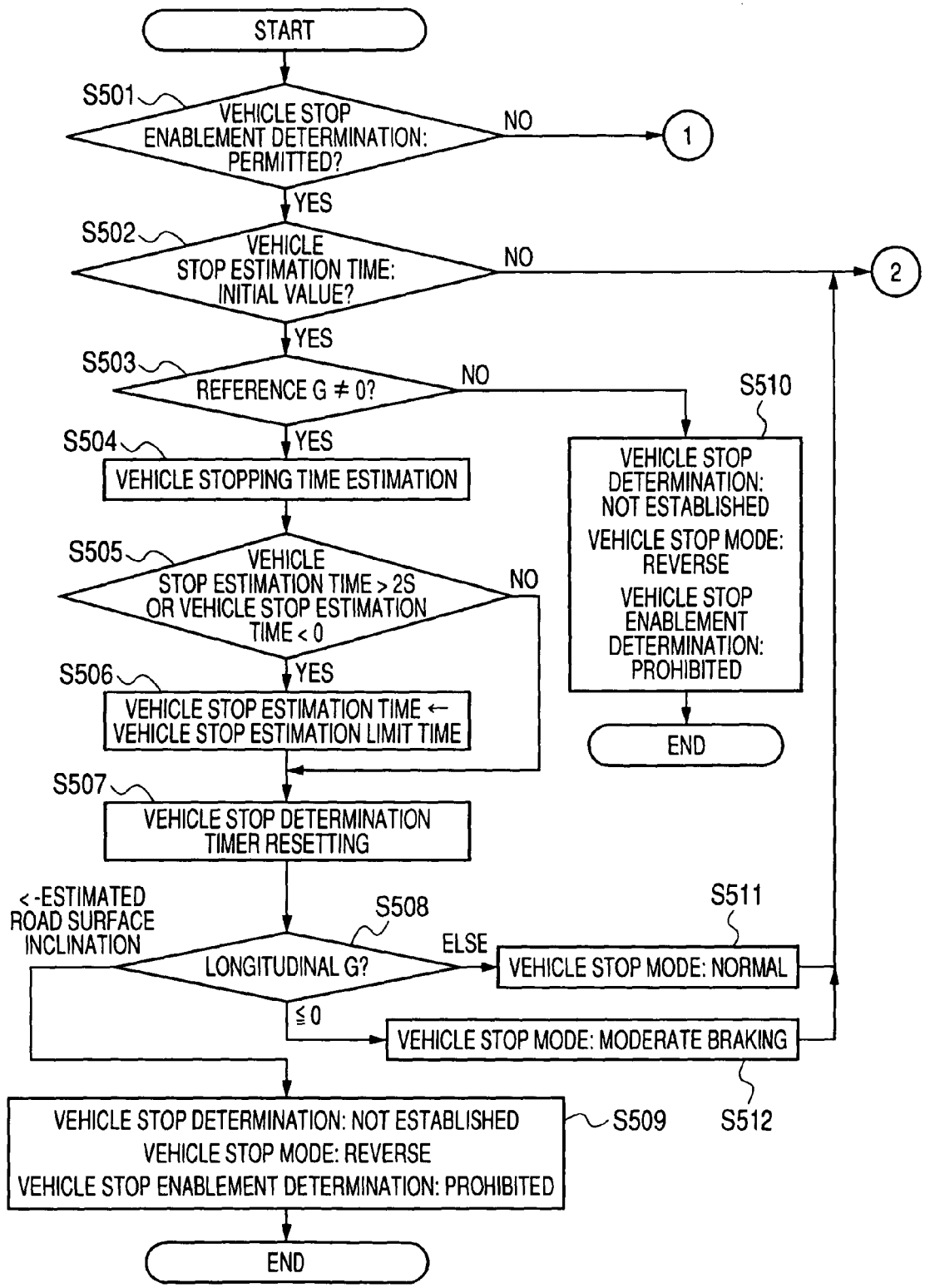
FIG. 8 A first partial diagram of a flowchart showing a vehicle stop determination routine in the hill hold function in FIG. 3.
Figure 9:
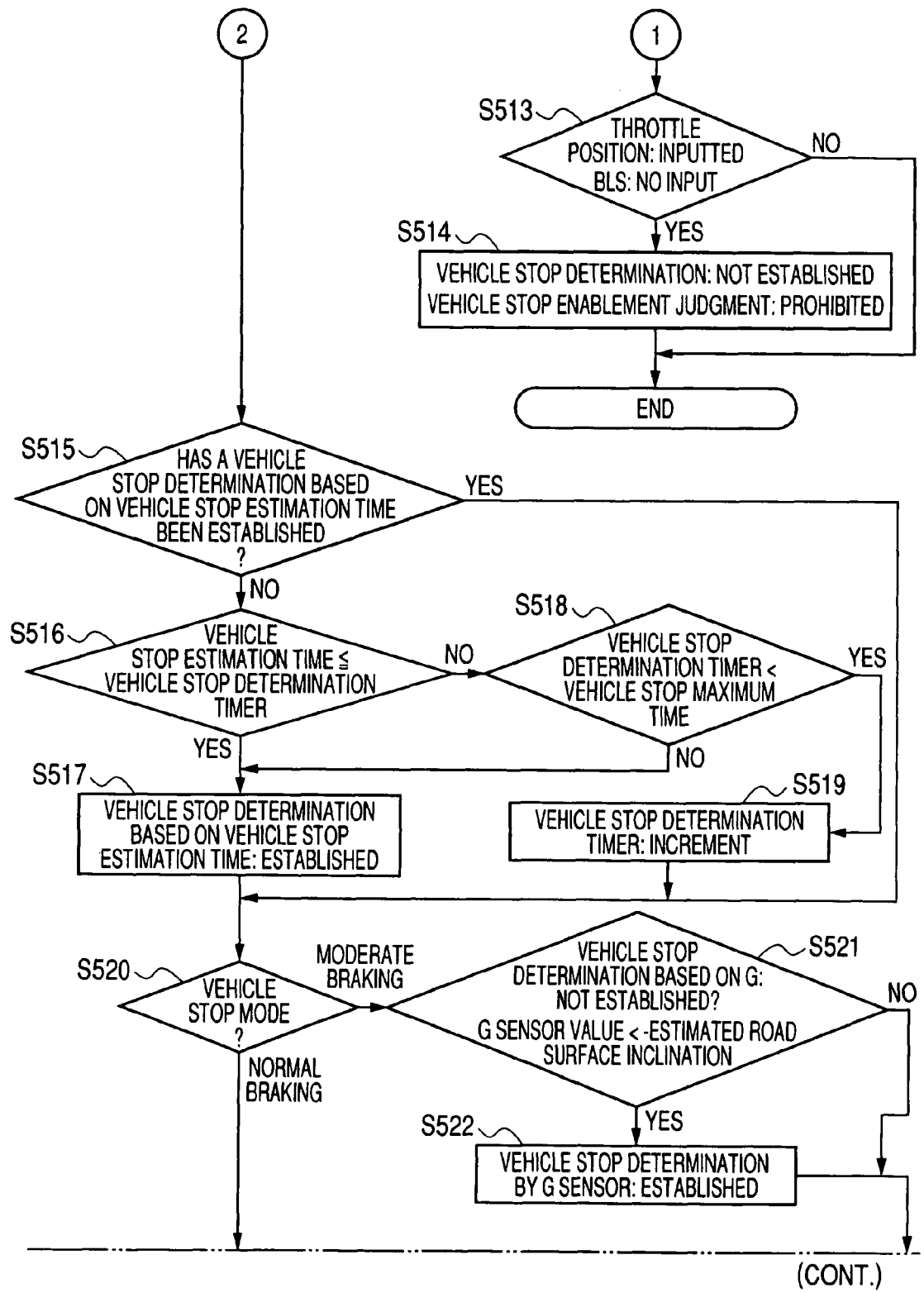
FIG. 9 A second partial diagram of a flowchart showing the vehicle stop determination routine in the hill hold function in FIG. 3.

FIGS. 8 and 9 are, respectively, a first partial diagram and a second partial diagram of flowcharts showing a vehicle stop determination routine in the hill hold function.

Figure 10:
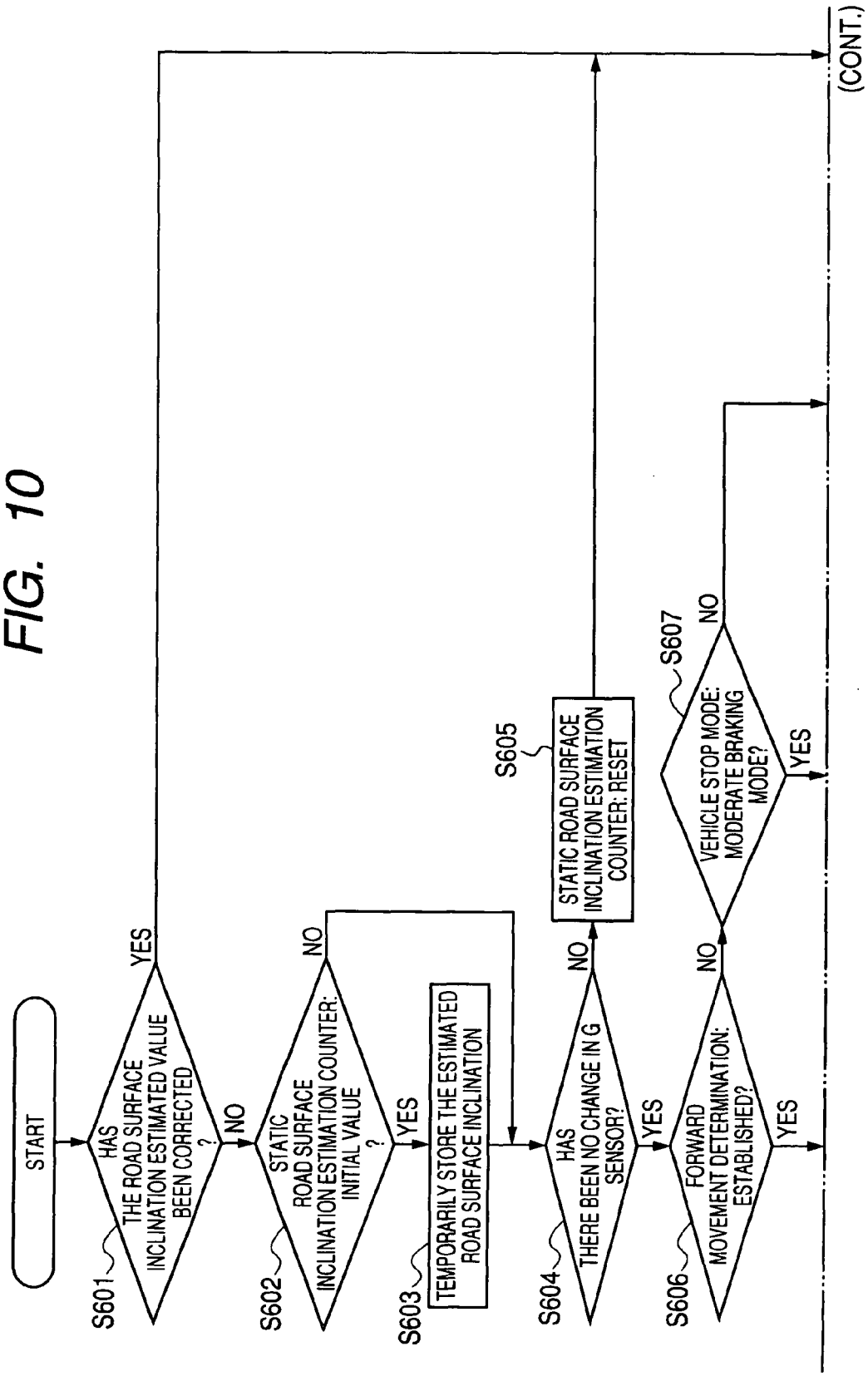
FIG. 10 A flowchart showing a static road surface inclination estimation routine in the hill hold function in FIG. 3.

FIG. 10 is a flowchart showing a static road surface inclination estimation routine in the hill hold function.

Figure 11:
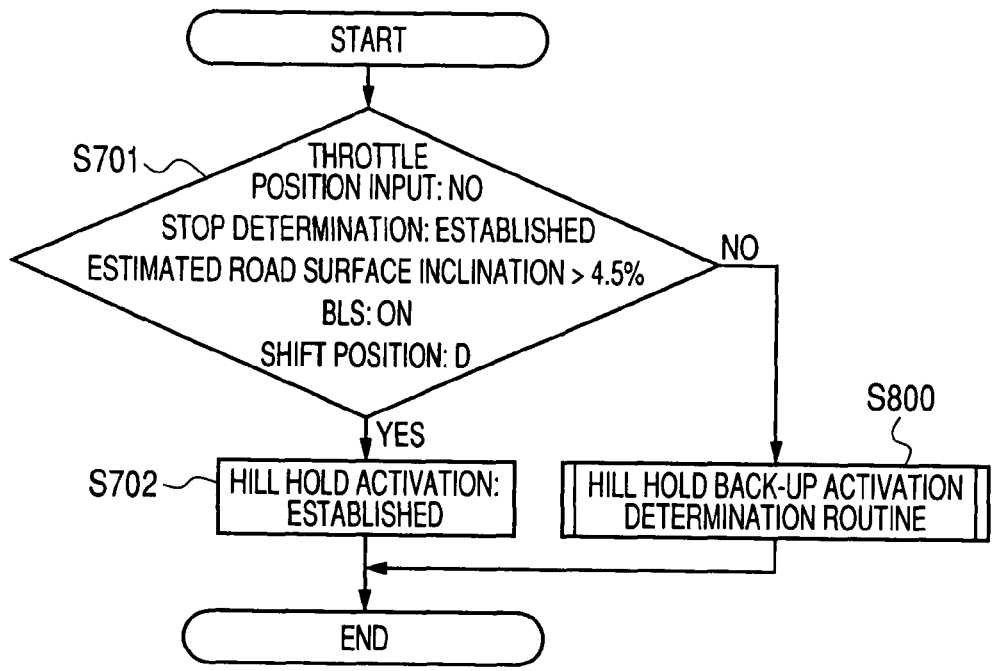
FIG. 11 A flowchart showing a hill hold activation determination routine in the hill hold function in FIG. 3.

FIG. 11 is a flowchart showing a hill hold activation determination routine in the hill hold function.

Figure 12:
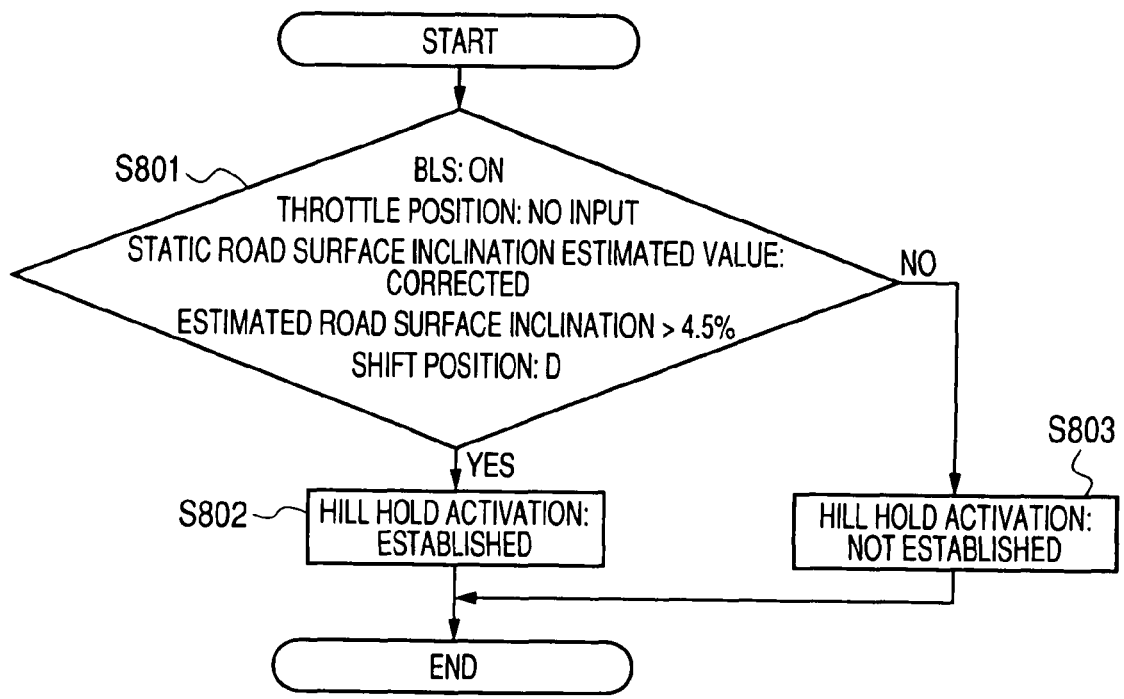
FIG. 12 A flowchart showing a hill hold back-up activation determination routine in the hill hold function in FIG. 3.

FIG. 12 is a flowchart showing a hill hold back-up activation determination routine in the hill hold operation determination routine.

Figure 13:
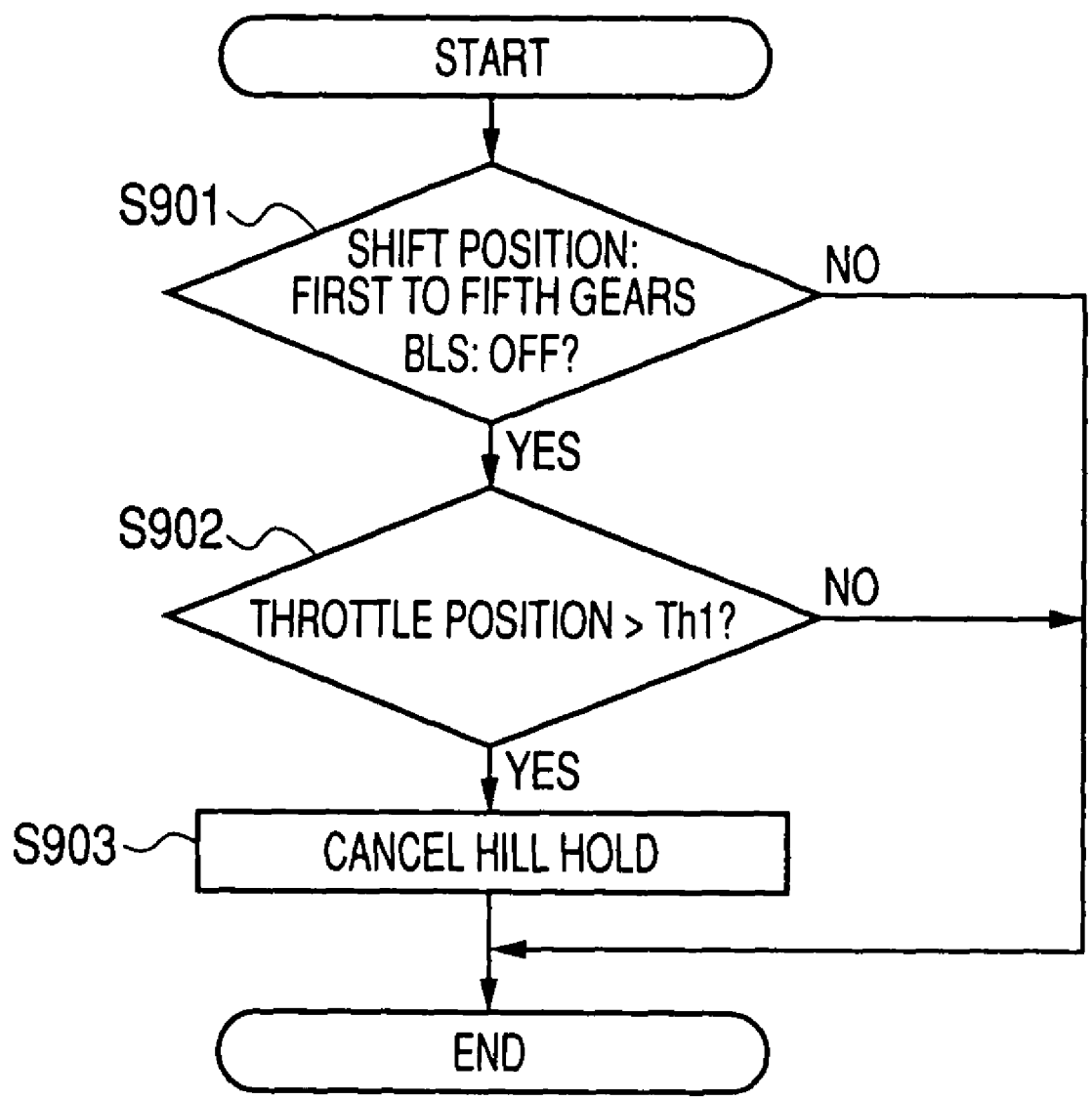
FIG. 13 A flowchart showing a hill hold cancellation determination routine in the hill hold function in FIG. 3.

FIG. 13 is a flowchart showing a hill hold cancellation determination routine in the hill hold function.

Hereinafter, the hill hold function will be described sequentially step by step.

<Main Routine>

<Step S01: Capture of Sensor Value>

The ECU 41 of the controller 40 communicates with the vehicle side unit 60 to acquire information on a throttle (accelerator) opening or position signal, a brake lamp switch (BLS) signal, an ABS operation flag, an average wheel speed of wheel speeds detected by left and right front wheel speed sensors (hereinafter, referred to simply as "wheel speed") Vso, and the temperature of engine coolant. In addition, the ECU 41 obtains an output signal of the G sensor 43.

Here, the throttle position signal includes information on the position of a throttle valve (a butterfly valve) in an electronically controlled throttle which regulates the output of the engine by controlling intake air.

The BLS is a signal which is on when the driver operates a brake pedal, not show, and indicates whether or not the brakes are applied.

<Step S02: Engine Coolant Temperature Judgment>

The ECU 41 judges that an idle up, which was started to warm the engine after the engine was started up, has been completed in the event that the engine coolant temperature obtained in step S01 exceeds 50° C., and the operation flow proceeds to step S03.

On the other hand, in the event that the engine coolant temperature is equal to or lower than 50° C., the ECU 41 judges that the idle up is still on and that creeping is being larger than when in a normal condition, and the operation flow proceeds to step S04.

<Step S03: Setting of Hill Hold Activation Inclination Threshold Value to 4.5%>

The ECU 41 sets a hill hold activation inclination threshold value, which is a threshold value of a road surface inclination at which the hill hold function is activated, to 4.5%, and the operation flow proceeds to step S05.

<Step S04: Setting of Hill Hold Activation Inclination Threshold Value to 10%>

The ECU 41 sets the hill hold activation inclination threshold value to 10%, and the operation flow proceeds to step S05.

<Step S05: Wheel Speed Vso Judgment>

The ECU 41 judges that the vehicle is running in the event that the wheel speed Vso obtained in step S01 exceeds 0 km/h, and the operation flow proceeds to step S06, whereas in the event that the wheel speed Vso is 0 km/h, the ECU 41 judges that the vehicle is brought to a standstill or is running at an extremely low speed in such a manner as to be nearly brought to a rest, and the operation flow proceeds to a vehicle stop determination routine S500.

<Step S06: Initialization of Parameters>

The ECU 41 initializes respective parameters that are to be used in a series of hill hold functions, and the operation flow proceeds to a reference G operation routine S100.

<Reference G Operation Routine S100>

The ECU 41 performs an operation of a reference G which is a deceleration of the vehicle which is estimated based on an output of the vehicle speed sensor 61 by the reference G operation routine, which will be described below.

As is shown in FIG. 4, the operation routine S100 includes respective steps which will be described below.

<Step S101: Wheel Speed Vso Judgment>

The ECU 41 causes the operation flow to proceed to step S102 in the event that the wheel speed Vso exceed 0 km/h, whereas the ECU 41 caused the operation flow to proceed to step S105 in the event that the wheel speed Vso is 0 km/h.

<Step S102: Operation of Reference G>

The ECU 41 calculates a reference G (Gr) by Equation 1 below.

$$\text{Reference } G\ (Gr)\ (\text{m/s}^2) = \Delta Vso\ (\text{km/h}) \times 1000/3600/9.8 \quad \text{(Equation 1)}$$

Here, $\Delta Vso$ is a difference between a wheel speed last sampled and a wheel speed sampled immediately before the last sampled wheel speed of wheel speeds Vso which were sampled at intervals of 1 second.

Then, the operation flow proceeds to step S103.

<Step S103: Operation of Change in Reference G>

The ECU 41 obtains a difference resulting by subtracting the reference G that was operated one cycle before (one second before) the reference G obtained in step S102 from the latter reference G, and the operation flow proceeds to step S104.

<Step S104: Storing of Result of Operation of Reference G>

The ECU 41 stores the results of the operations performed in steps S102 and S103 and ends the reference G operation routine S100.

<Step S105: Initialization of Variables>

The ECU 41 initializes the reference G and a variation in the reference G and furthermore initializes the respective variables used in these operations and ends the reference G operation routine S100.

Then, the operation flow returns to the main routine after the completion of step S104 or S105 to proceed to a turn determination routine S200.

<Turn Determination Routine S200>

The ECU 41 judges whether or not the front wheels of the vehicle are turned to a predetermined extent or more (through a predetermined turning angle or more) by a turn determination routine S200, which will be described below.

As is shown in FIG. 5, the turn determination routine S200 includes respective steps which will be described below.

<Step S201: Front Left and Right Wheel Speeds Judgment>

The ECU 41 detects rotational speeds of the left and right front wheels based on an output of the vehicle speed sensor 61, and if a speed difference between the front two wheels is less than 5%, the ECU 41 causes the operation flow to proceed to Step 202, whereas if the difference is 5% or larger, the ECU 41 causes the operation flow to proceed to step S203.

<Step S202: Non-Determination of Turn>

The ECU 41 does not establish a turn determination and ends the turn determination routine S200.

<Step S203: Determination of Turn>

The ECU 41 establishes a turn determination and ends the turn determination routine S200.

In addition, in the event that the turn determination routine S200 is ended in either of the steps described above, the ECU 41 causes the operation flow to return to the main routine to proceed to a forward movement determination routine S300.

<Forward Movement Determination Routine S300>

The ECU 41 determines whether or not the vehicle is running ahead or moving forwards by a forward movement determination routine S300, which will be described below.

The forward movement determination routine S300 includes, as is shown in FIG. 6, respective steps, which will be described below.

<Step S301: Forward Movement Determination Establishment Judgment>

The ECU 41 judges whether or not a forward movement determination has already been established, and if not established, the operation flow proceeds to step S302, whereas if established, the ECU 41 ends the forward movement determination routine S300.

<Step S302: Forward Movement Determination Counter Value Judgment>

The ECU 41 judges the current forward movement determination counter value. Here, the forward movement determination counter value is a counter value that is counted up in the event that the reference G obtained in the reference G operation routine S100 and the output of the G sensor 43 both indicate that the vehicle is being accelerated.

If the forward movement determination counter value is less than a predetermined threshold value, for example, 100, the operation flow proceeds to step S303, whereas if the relevant counter value is 100 or larger, the operation flow proceeds to step S306.

<Step S303: Non-Establishment of Forward Movement Determination>

The ECU 41 does not determine (establish) a forward movement determination, and the operation flow proceeds to step S304.

<Step S304: Reference G, G Sensor Output Judgment>

The ECU 41 causes the operation flow to proceed to step S305 if the reference G (Gr), which was obtained in the reference G operation routine S100, indicates that the vehicle is being accelerated and the G sensor value, which is the output of the G sensor 43, also indicates that the vehicle is being accelerated, and if in other cases, the ECU 41 ends the forward movement determination routine S300.

<Step S305: Forward Movement Counter Increment>

The ECU 41 increases the counter value of the forward movement determination counter and ends the forward movement determination routine S300.

<Step S306: Forward Movement Determination Establishment-Forward Movement Determination Counter Reset>

The ECU 41 determines (establishes) the forward movement determination, restores the forward movement counter value to the initial value so as to reset the forward movement determination counter and ends the forward movement determination routine S300.

In addition, if the forward movement determination routine S300 is ended in either of the steps described above, the ECU 41 causes the operation flow to return to the main routine to proceed to a dynamic road surface inclination estimation routine S400.

<Dynamic Road Surface Inclination Estimation Routine S400>

The ECU 41 estimates a longitudinal inclination (a dynamically estimated road surface inclination) of a road surface on which the vehicle is currently running while the vehicle is running (before the vehicle is brought to a stop) by a dynamic road surface inclination estimation routine S400, which will be described below.

As is shown in FIG. 7, the dynamic road surface inclination estimation routine S400 includes respective steps, which will be described below.

<Step S401: Dynamic Road Surface Inclination Estimation Enablement Judgment>

The ECU 41 detects the current running state of the vehicle and judges whether or not a dynamic road surface inclination estimation can be implemented. Specifically, the ECU 41 judges whether or not the following conditions are satisfied.

(a) The turn determination in the turn determination routine S200 was not established. This is because when the vehicle is being turned, the output of the G sensor 43 is caused to deviate from an actual deceleration of the vehicle.

(b) A panic braking is not applied to the vehicle. This is because when a panic braking is being applied to the vehicle, the nose-down pitching of the vehicle is increased and the output of the G sensor 43 is caused to deviate from an actual deceleration of the vehicle. Whether or not the panic braking is applied to the vehicle can be detected based on the output of the G sensor 43, a change in output of the vehicle speed sensor, the fluid pressure of a brake master cylinder and the like.

(c) The reference G was obtained in the reference G operation routine S100.

(d) The forward movement determination was established in the forward movement determination routine S300.

(e) The ABS is not in operation.

If the conditions described above are satisfied, the ECU 41 causes the operation flow to proceed to step S402, while if in other cases, the ECU 41 ends the dynamic road surface inclination estimation routine S400.

<Step S402: Estimated Road Surface Inclination Operation>

The ECU 41 calculates an estimated road surface inclination by subtracting the G sensor value, which is the output of the G sensor 43, from the reference G (Gr) obtained in the reference G operation routine S100 and holds the estimated road surface inclination so calculated, causing the operation flow to proceed to step S403. Note that the operation of an estimated road surface inclination like this is to be implemented periodically at predetermined intervals.

<Step S404: Low-Pass Filter Processing>

The ECU 41 performs a low-pass filter processing in which a specific high-frequency component is removed from data on an estimated road surface inclination which is to be operated in step S402, and the operation flow proceeds to step S404.

<Step S404: Target Braking Force P1 Setting>

The ECU 41 sets a target braking force P1 which can prevent the vehicle from starting to move based on the estimated road surface inclination (the dynamically estimated road surface inclination) on which the low-pass filter processing was performed in step S403, and the operation flow proceeds to step S404.

In addition, if the dynamic road surface inclination estimation routine is ended at step S401 or step S404, the ECU 41 causes the operation flow to return to the main routine to proceed to step S08.

<Vehicle Stop Determination Routine S500>

The ECU 41 determines whether or not the vehicle has been brought to a stop by a vehicle stop determination routine S500, which will be described below.

As is shown in FIGS. 8 and 9, the vehicle stop determination routine S500 includes respective steps, which will be described below.

<Step S501: Vehicle Stop Enablement Judgment>

The ECU 41 causes the operation flow to proceed to step S502 if the current state of vehicle stop determination is in a state of "permission," whereas if the vehicle stop determination is in a state of "prohibition," the ECU 41 causes the operation flow to proceed to step S513.

<Step S502: Initial Value of Vehicle Stop Estimation Time Judgment>

The ECU 41 causes the operation flow to proceed to step S503 if the vehicle stop estimation time is an initial value. The ECU 41 causes the operation flow to proceed to step S515 if the vehicle stop estimation time is other than the initial value.

<Step S503: Reference G Judgment>

The ECU 41 causes the operation flow to proceed to step S504 if the current reference G, which was operated in the reference G operation routine S100, is other than 0, whereas if the reference G is 0, the operation flow proceeds to step S510.

<Step S504: Vehicle Stopping Time Estimation>

The ECU 41 operates a vehicle stop estimation time which is a timing at which the vehicle is expected to be brought to a stop by dividing the current wheel speed Vso by the reference G (Gr), causing the operation flow to proceed to step S505.

<Step S505: Vehicle Stop Estimation Time Judgment>

The ECU 41 causes the operation flow to proceed to Step S506 if the vehicle stop-estimation time which was operated in step S504 is, for example, two seconds or more and is less than 0, while if in other cases, the operation flow proceeds to step S507.

<Step S506: Vehicle Stop Estimation Time←Vehicle Stop Estimation Limit Time>

The ECU 41 changes the vehicle stop estimation time to a vehicle stop estimation limit time which is a preset upper limit value of the vehicle stop estimation time, causing the operation flow to proceed to step S507.

<Step S507: Vehicle Stop Determination Timer Resetting>

The ECU 41 resets a vehicle stop determination timer, and the operation flow proceeds to step S508.

<Step S508: Longitudinal D Judgment>

The ECU 41 causes the operation flow to proceed to step S509 if the G sensor value outputted from the G sensor 43 is smaller than a value which results by reversing the sign (polarity) of the estimated road surface inclination (the negative value of the estimated road surface inclination), causes the operation flow to proceed to step S512 if it is 0 or smaller, and causes the operation flow to proceed to step S511 if in other cases.

<Step S509: End of Vehicle Stop Determination Routine>

The ECU 41 sets the vehicle stop determination to the "not established," the vehicle stop mode to the "reverse," and the vehicle stop enablement determination to the "prohibited," and ends the vehicle stop determination routine S500.

<Step S510: End of Vehicle Stop Determination Routine>

The ECU 41 sets the vehicle stop determination to the "not established," the vehicle stop mode to the "reverse," and the vehicle stop enablement determination to the "prohibited," and ends the vehicle stop determination routine S500.

<Step S511: Vehicle Stop Mode: Normal>

The ECU 41 sets the vehicle stop mode to the "normal," and causes the operation flow to proceed to step S515.

<Step S512: Vehicle Stop Mode: Moderate Braking>

The ECU 41 sets the vehicle stop mode to the "moderate braking," and causes the operation flow to proceed to step S515.

<Step S513: Throttle Position-BLS Judgment>

The ECU 41 ends the vehicle stop determination routine S500 if a throttle position is inputted thereinto but no input on the BLS is made (BLS being off), whereas if in other cases, the operation flow proceeds to step S514.

<Step S514: End of Vehicle Stop Determination Routine>

The ECU 41 sets the vehicle stop determination to the "not established," and the vehicle stop enablement judgment to the "prohibited," and ends the vehicle stop determination routine S500.

<Step S515: Vehicle Stop Determination Establishment Judgment Based on Vehicle Stop Estimation Time>

The ECU 41 judges whether or not the vehicle determination (refer to step S517) based on the vehicle stop estimation time has already been established, and if established, the operation flow proceeds to step S520, whereas if not established yet, the operation flow proceeds to step S516.

<Step S516: Comparison of Vehicle Stop Estimation Time with Vehicle Stop Determination Timer>

The ECU 41 compares the vehicle stop estimation time with the current timer value of the vehicle stop determination timer, and if the timer value is equal to or larger than the vehicle stop estimation time, the operation flow proceeds to step S517, whereas if it is less than the vehicle stop estimation time, the operation flow proceeds to step S518.

<Step S517: Vehicle Stop Determination Establishment Based on Vehicle Stop Estimation Time>

The ECU 41 establishes the vehicle stop determination based on the vehicle stop estimation time, causing the operation flow to proceed to step S520.

<Step S518: Comparison of Vehicle Stop Determination Timer with Vehicle Stop Maximum Time>

The ECU 41 compares the timer value of the vehicle stop determination timer with a vehicle stop maximum time which is a preset constant, and if the timer value is less than the vehicle stop maximum time, the operation flow proceeds to step S519, whereas if in other cases, the operation flow proceeds to step S517.

<Step S519: Vehicle Stop Determination Timer Increment>

The ECU 41 makes the timer value of the vehicle stop determination time be counted up (increased), causing the operation flow to proceed to step S520.

<Step S520: Vehicle Stop Mode Judgment>

The ECU 41 judges the vehicle stop mode which was set in step S511 or step S512, and if the mode is the "normal," the operation flow proceeds to step S523, whereas if the mode is the "moderate braking," the operation flow proceeds to step S521.

<Step S521: Vehicle Stop Determination Establishment Judgment by G Sensor>

The ECU 41 causes the operation flow to proceed to step S522 if the vehicle stop determination (refer to steps S522, S524) by the G sensor has not been established yet and the G sensor value outputted from the G sensor 43 is smaller than a value which results by reversing the sign of the estimated road surface inclination, and if in other cases, the ECU 41 causes the operation flow to proceed to step S525.

<Step S522: Vehicle Stop Determination Establishment by G Sensor>

The ECU 41 establishes the vehicle stop determination by the G sensor, causing the operation flow to proceed to step S525.

<Step S523: Vehicle Stop Determination by G Sensor>

The ECU 41 causes the operation flow to proceed to step S524 if the vehicle stop determination by the G sensor has not been established yet and the G sensor value outputted from the G sensor 43 is smaller than a value which results by reversing the sign of the estimated road surface inclination, and if in other cases, the ECU 41 causes the operation flow to proceed to step S525.

<Step S524: Vehicle Stop Determination Establishment by G Sensor>

The ECU 41 establishes the vehicle stop determination by the G sensor, causing the operation flow to proceed to step S525.

<Step S525: Vehicle Stop Determination Establishment Judgment Based on Vehicle Stop Estimation Time and G Sensor>

The ECU 41 causes the operation flow to proceed to step S526 if both the vehicle stop determination based on the vehicle stop estimation time and the vehicle stop determination based on the G sensor are established, while if at least one of those vehicle stop determination is has not yet been established, the operation flow proceeds to step S527.

<Step S526: BLS Judgment>

The ECU 41 causes the operation flow to proceed to step S529 if the BLS is on, whereas if off, the operation flow proceeds to step S528.

<Step S527: Non-Establishment of Vehicle Stop Determination>

Judging that the vehicle stop determination has not yet been established, the ECU 41 ends the vehicle stop determination routine S500.

<Step S528: Non-Establishment of Vehicle Stop Determination>

Judging that the vehicle stop determination has not yet been established, the ECU 41 sets the vehicle stop mode to the "reverse," and the vehicle stop determination enablement to the "prohibited," ending the vehicle stop determination routine S500.

<Step S529: Establishment of Vehicle Stop Determination>

The ECU 41 establishes the vehicles stop determination and sets the vehicle stop determination enablement to the "prohibited," ending the vehicle stop determination routine S500.

In addition, if the vehicle stop determination routine S500 is ended in any of the steps described above, the ECU 41 causes the operation flow to return to the main routine to proceed to a static road surface inclination estimation routine S600.

<Static Road Surface Inclination Estimation Routine S600>

The ECU 41 determines a longitudinal inclination of a road surface on which the vehicle is currently being stopped after the vehicle has been so stopped (after the vehicle stop determination has been established) by a static road surface inclination estimation routine S600, which will be described later, so as to correct the estimated road surface inclination which was estimated in the dynamic road surface inclination determination routine S400.

As is shown in FIG. 10, the static road surface inclination routine S600 includes respective steps, which will be described below.

<Step S601: Road Surface Inclination Estimated Value Correction Completion Judgment>

The ECU 41 judges whether or not the road surface inclination estimated value was already corrected in the static road surface inclination estimation routine S600, and ends the static road surface inclination estimation routine S600 if it was corrected, whereas if not yet corrected, the operation flow proceeds to step S602.

<Step S602: Static Road Surface Inclination Estimation Counter Value Judgment>

The ECU 41 causes the operation flow to proceed to step S603 if the counter value a static road surface inclination estimation counter is an initial value, while if it is other than the initial value, the operation flow proceeds to step S604. Here, the static road surface inclination estimation counter means a timer which counts a time that has elapsed since an output of the G sensor 43 attributed to the pitching of the vehicle body converged and the variation thereof became equal to or smaller than a predetermined value.

<Step S603: Storage of Estimated Road Surface Inclination>

The ECU 41 stores the current G sensor value and causes the operation flow to proceed to step S604.

<Step S604: G Sensor Change Occurrence Judgment>

The ECU 41 compares a G sensor value last stored with a G sensor value stored before and judges whether or not a variation therebetween can be ignored. Judging that the G sensor value has not changed substantially when the variation is equal to or smaller than, for example, a preset threshold value, the ECU 41 causes the operation flow to proceed to Step S606, while if in other cases, the operation flow proceeds to step S605.

<Step S605: Static Road Surface Inclination Estimation Counter Resetting>

The ECU 41 resets the static road surface inclination estimation counter and ends the static road surface inclination estimation routine S600.

<Step S606: Forward Movement Determination Establishment Judgment>

The ECU 41 judges whether or not the forward movement determination was established in the forward movement determination routine S300, and if the forward movement determination was established, the ECU 41 causes the operation flow to proceed to step S611, whereas if it was not established, the operation flow proceeds to step S607.

<Step S607: Vehicle Stop Mode Judgment>

The ECU 41 causes the operation flow to proceed to step S621 if the vehicle stop mode that was set in the vehicle stop determination routine S500 was the "moderate braking" mode, while if in other cases, the operation flow proceeds to step S631.

Here, when proceeding to step S621, this is, for example, a case where the vehicle is brought to a stop with a small deceleration, while when proceeding to step S631, it is a case where the vehicle is in the running mode where the vehicle repeats starts and stops within a short period of time of several seconds as when the vehicle is involved in a traffic jam.

<Step S611: Static Road Surface Inclination Estimation Counter Judgment>

The ECU 41 compares the counter value of the static road surface inclination estimation counter with T1 which is a predetermined threshold value, and if the counter value is smaller than T1, the operation flow proceeds to step S612, whereas if in other cases, the operation flow proceeds to S613.

Here, T1 is a time which constitutes a condition for establishment of a back-up vehicle stop determination by the ECU 41 in the event that a state where the G sensor value does not change substantially continues for a longer period of time than T1.

<Step S612: Static Road Surface Inclination Estimation Counter Increment>

The ECU 41 counts up (increases) the counter value of the static road surface inclination estimation counter and ends the static road surface inclination estimation routine S600.

<Step S613: Back-Up Vehicle Stop Determination Establishment>

The ECU 41 establishes a back-up vehicle stop determination, resets the forward movement determination so that it is in a non-determined state, sets the vehicle stop mode to the "moderate braking mode" and ends the static road surface inclination estimation routine S600.

Note that when the forward movement determination is established, in order to cause the back-up operation to be performed as soon as possible, the time spent judging that the oscillation in the pitching direction of the vehicle has converged is made shorter than in the other conditions. Because of this, there may occur a case where the oscillation has not yet converged in reality even in the event that the completion of convergence of the oscillation is made, and in case the inclination is corrected based on the G sensor value then, there may be caused an erroneous correction, and therefore, it is decided that no correction of inclination is carried out here. In this case, however, since the vehicle stop mode is set to the moderate braking mode, when the next cycle occurs, the operation flow is made to enter, at step S607, a moderate braking flow which is deployed from S621 onward, so as to perform a correction of inclination after a certain period of time has elapsed since the entrance to the flow.

<Step S621: Static Road Surface Inclination Estimation Counter Judgment>

The ECU 41 compares the counter value of the static road surface inclination estimation counter with T2 which is a predetermined threshold value which is different from the T1, and if the counter value is smaller than T2, the operation flow proceeds to step S622, whereas if in other cases, the operation flow proceeds to S623.

Here, the threshold value T2 is set larger (longer) than the threshold value T1 for the normal vehicle stop in order to prevent the occurrence of a feeling of being caught when the vehicle is brought to a stop under the moderate braking with a smaller deceleration than when the vehicle is brought to a stop in the normal way.

<Step S622: Static Road Surface Inclination Estimation Counter Increment>

The ECU 41 counts up (increases) the counter value of the static road surface inclination estimation counter and ends the static road surface inclination estimation routine S600.

<Step S623: Road Surface Inclination Correction Implementation>

The ECU 41 corrects the estimated road surface inclination that was operated in the dynamic road surface inclination estimation routine S400 based on the current G sensor value that was temporarily stored in step S603. Specifically, if the road surface inclination that is estimated based on the G sensor value (the statically estimated road surface inclination) is larger than the current estimated road surface inclination (the dynamically estimated road surface inclination), a correction is implemented so that the estimated road surface inclination is increased according to the former inclination. Thereafter, the operation flow proceeds to step S624.

<Step S624: Target Braking Force P2 Setting>

The ECU 41 sets a target braking force P2 which can prevent the vehicle from starting to move based on the estimated road surface inclination (the statically estimated road surface inclination) that was corrected in step S623 and causes the operation flow to proceed to step S625.

<Step S625: Back-Up Vehicle Stop Determination>

The ECU 41 establishes a back-up vehicle stop determination and ends the static road surface inclination estimation routine S600.

<Step S631: Static Road Surface Inclination Estimation Counter Judgment>

The ECU 41 compares the counter value of the static road surface inclination estimation counter with T2 which is a predetermined threshold value which is different from the T1 and T2, and if the counter value is smaller than T3, the operation flow proceeds to step S632, whereas if in other cases, the operation flow proceeds to S633.

Here, the threshold value T3 is set larger (longer) than T1 but is set smaller (shorter) than T2.

<Step S632: Static Road Surface Inclination Estimation Counter Increment>

The ECU 41 counts up (increases) the counter value of the static road surface inclination estimation counter and ends the static road surface inclination estimation routine S600.

<Step S633: Road Surface Inclination Correction Implementation>

The ECU 41 corrects the estimated road surface inclination in a similar way to that used in step S624 above and causes the operation flow to proceed to step S634.

<Step S634: Target Braking Force P2 Setting>

The ECU 41 sets a target braking force P2 in a similar way to that used in step S624 above and causes the operation flow to proceed to step S635.

<Step S635: Back-up Vehicle Stop Determination>

The ECU 41 establishes a back-up vehicle stop determination and ends the static road surface inclination estimation routine S600.

In addition, if the static road surface inclination estimation routine S600 is ended in any of the steps described above, the operation flow returns to the main routine to proceed to step S07.

<Step S07: Hill Hold In-Operation Judgment>

The ECU 41 judges whether or not a hill hold is currently in operation. Here, the hill hold means a state where the parking brakes 10 are activated to operate with a braking force which is increased (reapplied) to be greater than a braking force for the flat ground.

In addition, if the hill hold is not in operation, the operation flow proceeds to a hill hold activation determination routine S700, whereas if in operation, the operation flow proceeds to a hill hold cancellation determination routine S900.

<Hill Hold Activation Determination Routine S700>

The ECU 41 determines whether or not the hill hold is activated by a hill hold activation determination routine S700, which will be described below, and in the event that the activation thereof is necessary, the ECU 41 activates the hill hold so as to increase the braking force of the parking brakes 10.

Here, since the calculation of the estimated road surface inclination in the aforesaid static road surface inclination determination routine S600 takes a predetermined period of time, in this hill hold activation determination routine S700, firstly, a hill hold activation determination is implemented based on the estimated road surface inclination obtained in the dynamic road surface inclination estimation routine S400, which is not corrected. Thereafter, in the event that the estimated road surface inclination is corrected after the respective routines have been repeated until the calculation of the estimated road surface inclination is completed in the static road surface inclination determination routine S600, a hill hold activation determination is implemented using the estimated road surface inclination so corrected, so as to increase the braking force (reapply the paring brakes 10).

As is shown in FIG. 11, the hill hold activation determination routine S700 includes respective steps, which will be described below, as well as a hill hold back-up activation determination routine S800 (refer to FIG. 12).

<Step S701: Vehicle State Judgment>

The ECU 41 judges whether or not respective conditions below are satisfied, and if all the conditions are satisfied, the ECU 41 causes the operation flow to proceed to step S702, while even one of the conditions is not satisfied, the operation flow proceeds to the hill hold back-up activation determination routine S800.

(a) Throttle Position Input: No input
(b) Vehicle Stop Determination: Established
(c) Estimated Road Surface Inclination>4.5%

(However, in the event that the hill hold activation inclination threshold value is set to 10% in step S04, Estimated Road Surface Inclination>10%.)

(d) BLS: ON (e) Shift Position: D (first to fifth gears)

<Step S702: Hill Hold Activation Establishment>

The ECU 41 establishes a hill hold activation and ends the hill hold activation determination routine S700.

<Hill Hold Back-Up Activation Determination Routine S800>

As is shown in FIG. 12, the hill hold back-up activation determination routine S800 includes respective steps, which will be described below.

<Step S801: Vehicle State Judgment>

The ECU 41 judges whether or not respective conditions below are satisfied, and if all the conditions are satisfied, the ECU causes 41 the operation flow to proceed to step S802, while even one of the conditions is not satisfied, the operation flow proceeds to step S803.

(a) BLS: ON (b) Throttle Position: No input (c) Road Surface Inclination Estimated Value: Corrected in the static road surface inclination determination routine S600

(d) Estimated Road Surface Inclination>4.5%

(However, in the event that the hill hold activation inclination threshold value is set to 10% in step S04, Estimated Road Surface Inclination>10%.)

(e) Shift Position: D (first to fifth gears)

<Step S802: Hill Hold Activation Establishment>

The ECU 41 establishes a hill hold activation and ends the hill hold back-up activation determination routine S800 and the hill hold activation determination routine S700.

<Step S803: Non-Establishment of Hill Hold Activation>

The ECU 41 does not establish a hill hold activation and ends the hill hold back-up activation determination routine S800 and the hill hold activation determination routine S700.

Then, if a hill hold activation is established in the hill hold activation determination routine S700 and the hill hold back-up activation determination routine S800, the controller 40 energizes the actuator unit 20 so as to increase the braking force of the parking brakes 10 (reapply the parking brakes 10) from the flat ground braking force. As this occurs, if the target braking force P2 that was set in the static road surface inclination estimation routine S600 is larger than the target braking force P1 that was set in the dynamic road surface estimation routine S400, the target braking force P2 is adopted in place of the target braking force P1. In addition, if the parking brakes have already been put in operation with the target braking force P1 then, the braking force is increased.

In addition, if the hill hold activation determination routine S700 is ended, the operation flow returns to the main routine to proceed to step S08.

<Hill Hold Cancellation Determination Routine S900>

The ECU 41 determines whether or not the hill hold needs to be cancelled when the vehicle is started up by a hill hold cancellation determination routine S900, which will be described below.

The hill hold cancellation determination routine S900 includes, as is shown in FIG. 13, respective steps, which will be described below.

<Step S901: Shift Position BLS Judgment>

The ECU 41 communicates with the vehicle side unit 60 so as to obtain information on the shift position of the transmission and the BLS. Then, if the shift positions is in any of the first to fifth gears and the BLS is off, judging that the driver is preparing the start of the vehicle, the ECU 41 causes the operation flow to proceed to step S902, while if in other cases, the ECU 41 ends the hill hold cancellation determination routine S900.

<Step S902: Throttle Position Judgment>

The ECU 41 compares the current throttle position with a preset threshold value Th1, and if the throttle position is larger than the threshold value Th1, the ECU 41 causes the operation flow to proceed to step S903, while if in other cases, the ECU 41 ends the hill hold cancellation determination routine S900.

<step S903: Hill Hold Cancellation>

The ECU 41 cancels the hill hold and ends the hill hold cancellation determination routine S900, the controller 40 energizes the actuator unit 20 so as to shift the parking brakes 10 from the braking state to the released state.

In addition, if the hill hold cancellation determination routine S900 is ended in either of the steps above, the operation flow returns to the main routine to proceed to step S08.

<Step S08: G Sensor Value Storage>

The ECU 41 stores a G sensor value which is outputted from the G sensor 43 and returns to step S01 again to repeat the operations therefrom onward (return).

According to Embodiment 1 that has been described heretofore, the following advantages can be obtained.

(1) An estimated road surface inclination is dynamically obtained while the vehicle is running by comparing the reference G that was operated from the vehicle speed with an output of the G sensor 43, and an estimated road surface inclination is statically obtained again based on an output of the G sensor 43 after the vehicle has been brought to a stop, whereby in the event that the latter inclination is larger than the former inclination, the target braking force of the parking brakes 10 is increased. Due to this configuration, the electric parking brake can be activated to operate immediately based on the estimated road surface inclination calculated while the vehicle was running when the vehicle is stopped on a slope. In addition, even in the event that there was an error in estimating the road surface inclination while the vehicle was running, when the estimated road surface inclination that was obtained based on the output of the G sensor 43 after the vehicle had been brought to a stop is larger than the estimated road surface inclination that was calculated while the vehicle was running, the correction to increase the estimated road surface inclination is performed, thereby making it possible to increase the braking force of the parking brakes so as to prevent the vehicle from starting to move.

In addition, since the statically estimated road surface inclination is estimated based on the output of the G sensor 43, the braking force is increased at an earlier timing than the timing at which the vehicle starts to move, thereby making it possible to prevent the vehicle from starting to move as required.

The behavior of the vehicle body in the pitching direction thereof is detected based on an output of the G sensor 43, and the estimated road surface inclination is corrected based an output of the G sensor 43 after the behavior has converged, whereby the occurrence of an error attributed to pitching can be prevented. In addition, since the pitching of the vehicle like this converges within a short period of time after the vehicle is brought to a stop, the estimated road surface inclination can be corrected immediately.

Embodiment 2

Next, Embodiment 2 of an electric parking brake system will be described as a second exemplary embodiment of the electric parking brake control system of the invention. Note that the same reference numerals with Embodiment 1 will be imparted to similar locations to Embodiment 1 so as to omit the description thereof, and those different from Embodiment 1 will mainly be described.

In Embodiment 2, the vehicle is fitted with a manual transmission, and as a hill hold function thereof, in place of the hill hold cancellation determination routine S900 in Embodiment 1 above, the following hill hold cancellation determination routine is provided.

Figure 14:
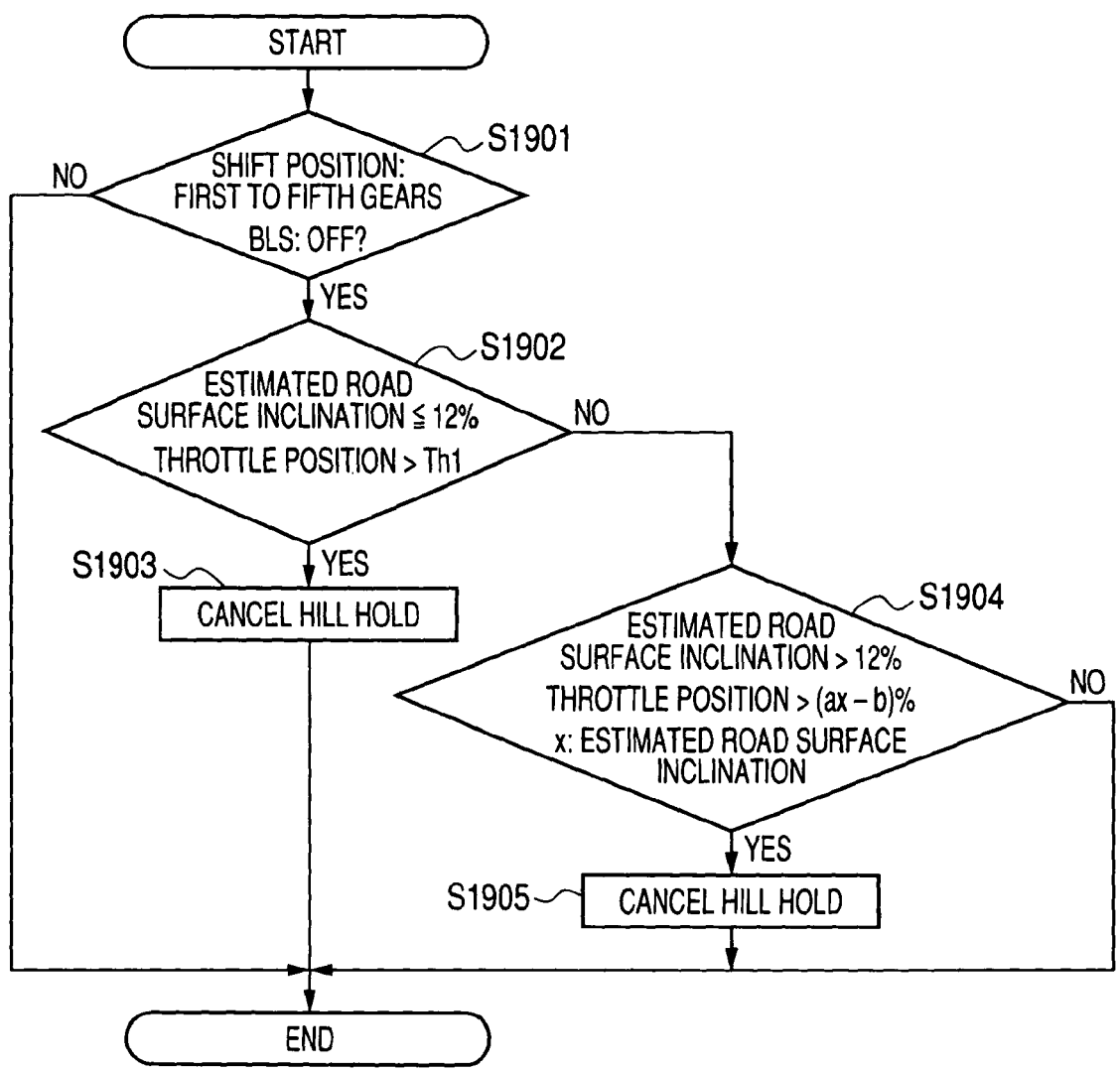
FIG. 14 A flowchart showing a hill hold cancellation determination routine in a hill hold function of an electric parking brake system according to Embodiment 2.

FIG. 14 is a flowchart showing a hill hold cancellation determination routine according to Embodiment 2.

Hereinafter, the relevant routine will be described sequentially step by step.

<Step S1901: Shift Position BSL Judgment>

An ECU 41 communicates with a vehicle side unit 60 to obtain information on the shift position of a transmission and a BLS. Then, if the shift position is in any of first to fifth gears and the BLS is off, judging that the driver is preparing the start of the vehicle, the ECU 41 causes the operation flow to proceed to Step S1902, while if in other cases, the ECU 41 ends the hill hold cancellation determination routine.

<Step S1902: Estimated Road Surface Inclination Throttle Position Judgment (1)>

If an estimated road surface inclination is equal to or smaller than, for example, 12% and a throttle position is larger than a threshold value Th1, the operation flow proceeds to step S1903, while if in other cases, the operation flow proceeds to step S1904.

<Step S1903: Hill Hold Cancellation>

The ECU 41 cancels the hill hold and ends the hill hold cancellation determination routine, whereby a controller 40 energizes an actuator unit 20 so as to shift parking brakes 10 from a braking state to a released state.

<Step S1904: Estimated Road Surface Inclination-Throttle Position Judgment (2)>

If the estimated road surface inclination exceeds 12% and the throttle position satisfies Equation 2 below, the ECU 41 causes the operation flow to proceed to step S1905, while if in other cases, the ECU 41 ends the hill hold cancellation determination routine.

$$\text{Throttle Position} > (ax-b)\% \quad (2)$$

where a, b denote constants and x denotes estimated road surface inclination.

<Step S1905: Hill Hold Cancellation>

The ECU 41 cancels the hill hold and ends the hill hold cancellation determination routine.

According to Embodiment 2 that has been described above, in addition to an advantage similar to that provided in Embodiment 1, by changing the cancellation conditions of the hill hold according to the inclination of the road surface, an appropriate cancellation of the hill hold can be performed even on the vehicle which is fitted with the manual transmission and which does not generate creeping which is inherent in an automatic transmission.

Modified Examples

The invention is not limited to the exemplary embodiments that have been described heretofore (Embodiments 1 and 2) but can be modified or changed variously, and those modifications or changes made to the invention also fall within the technical scope of the invention.

(1) While in the exemplary embodiments, the braking force is increased when the statically estimated road surface inclination that was estimated based on the acceleration after the vehicle was brought to a stop is larger than the dynamically estimated road surface inclination that was estimated while the vehicle was running, the invention is not limited thereto, and hence, a configuration may be adopted in which the braking force is increased when the statically estimated target braking force that is the target braking force after the vehicle is stopped which was obtained based on the statically estimated road surface inclination is larger than the dynamically estimated target braking force that is the target braking force after the vehicle is stopped which was obtained based the dynamically estimated road surface inclination (the target braking force is changed from the dynamically estimated target braking force to the statically estimated target braking force).

(2) While in the exemplary embodiments, the estimation of road surface inclination while the vehicle is running is implemented by comparing the reference G obtained based on the change in vehicle speed with the output of the G sensor, the invention is not limited thereto, and hence, the road surface inclination may be estimated using other methods. For example, an inclination of a road surface may be estimated based on engine torque and a relationship between vehicle weight and vehicle speed.

(3) While in the exemplary embodiments, the hill hold activation is judged after the estimated road surface inclination that was estimated while the vehicle was running was corrected according to the G sensor value resulting after the vehicle was brought to a stop, the invention is not limited thereto, and hence, the hill hold is made to be activated by a braking force according to the estimated road surface inclination that was estimated while the vehicle was running, thereafter, an estimated road surface inclination is obtained which results from the G sensor value after the vehicle is brought to a stop, so that the braking force is increased as required.

(4) The configuration of the electric parking brake system is not limited to that described in the exemplary embodiments but can be modified as required.

For example, while the parking brake in the exemplary embodiments is such as to use the brake drum which is disposed on the inside diameter side of the brake disk for the foot or service brake, the type of the parking brake may be of another type. For example, a common friction material may be shared between the disc brake or drum brake for the foot or service brake and the parking brake, so that the disc brake or drum brake can be integrated with the parking brake.

In addition, while the parking brake of the exemplary embodiment is such that the parking brake is driven via the parking brake cable using the electric actuator fixed to the body side, the invention is not limited thereto. For example, the invention can be applied to a so-called built-in type electric parking brake in which an electric actuator is provided on a wheel hub side so as to be integrated with the parking brake.

While in the exemplary embodiments, the convergence of pitching of the vehicle body is detected based on acceleration, the invention is not limited thereto, and hence, other methods may be used to detect the convergence of pitching. For example, when stroke sensors are provided on suspension systems, the convergence of pitching may be detected based on output of the stroke sensors.

What is claimed is:

1. An electric parking brake control apparatus for controlling an electric actuator for driving a parking brake, the apparatus is configured to:

estimate a dynamic road surface inclination based on a running state of a vehicle while the vehicle is running;

estimate a static road surface inclination based on an acceleration acting on the vehicle after the vehicle is stopped;

increase a braking force of the parking brake to a first target braking force that is set based on the dynamic road surface inclination, after the vehicle is stopped; and increase the braking force of the parking brake to a second target braking force, if the static road surface inclination is greater than the dynamic road surface inclination, after the vehicle is stopped.

2. The electric parking brake control apparatus according to claim 1, wherein the static road surface inclination is estimated based on an acceleration which acts on the vehicle after the behavior of the vehicle in a pitching direction has converged.

3. The electric parking brake control system according to claim 1, wherein the dynamic road surface inclination is estimated by comparing a change in speed of the vehicle and an acceleration which acts on the vehicle.

4. The electric parking brake control apparatus of claim 1, further comprising:
a controller including an electronic control unit (ECU) and a G sensor;
a control switch connected to the controller; and
a vehicle speed sensor connected to the controller via a vehicle side unit;
wherein the ECU comprises an acceleration data processing unit that processes an output from the G sensor and estimates the dynamic road surface inclination and the static road surface inclination based on the output of the G sensor.

5. The electric parking brake control apparatus of claim 4, wherein said acceleration data processing unit estimates the static road surface inclination by:
initializing a value of a static road surface inclination estimation counter;
storing a current G sensor value;
comparing the current G sensor value with a previously stored G sensor value to determine if a variation between the current G sensor value and the previously stored G sensor value is equal to or smaller than a predetermined value;
determining if there is a forward movement to a vehicle, if the variation is smaller than the predetermined value; and
increasing the value of the static road surface inclination estimation counter by an increment, if it is determined the vehicle is stopped, or backed up, and
wherein said estimating the dynamic road surface inclination further comprises:
calculating a reference G value and a variation in the reference G value;
sensing a G sensor value; and
subtracting the G sensor value from the reference G value.

6. An electric parking brake control apparatus for controlling an electric actuator for driving a parking brake, the apparatus is configured to:
dynamically estimate a first road surface inclination based on a running state of a vehicle while the vehicle is running;
determine a dynamically estimated target braking force that is a target braking force after the vehicle is stopped, based on the first road surface inclination,
statically estimate a second road surface inclination based on an acceleration acting on the vehicle after the vehicle is stopped;
determine a statically estimated target braking force that is a target braking force after the vehicle is stopped, based on the second road surface inclination;

increase a braking force of the parking brake to the dynamically estimated target braking force after the vehicle is stormed; and increase the braking force of the parking brake to be greater than the dynamically estimated target braking force, if the statically estimated target braking force is greater than the dynamically estimated target braking force, after the vehicle is stopped.

7. The electric parking brake control method according to claim 6, wherein the second road surface inclination is estimated based on an acceleration which acts on the vehicle after the behavior of the vehicle in a pitching direction has converged.

8. The electric parking brake control method according to claim 6, wherein the first road surface inclination is estimated by comparing a change in speed of the vehicle and an acceleration which acts on the vehicle.

9. An electric parking brake control method for controlling an electric actuator for driving a parking brake, the method comprising:
estimating a dynamic road surface inclination based on a running state of a vehicle while the vehicle is running;
estimating a static road surface inclination based on an acceleration acting on the vehicle after the vehicle is stopped; and
increasing a braking force of the parking brake to a first target braking force that is set based on the dynamic road surface inclination, after the vehicle is stopped; and
increasing the braking force of the parking brake to a second target braking force that is greater than the first target braking force, if the static road surface inclination is greater than the dynamic road surface inclination, after the vehicle is stopped.

10. The electric parking brake control method according to claim 9, wherein the static road surface inclination is estimated based on an acceleration which acts on the vehicle after the behavior of the vehicle in a pitching direction has converged.

11. The electric parking brake control method according to claim 9, wherein the dynamic road surface inclination is estimated by comparing a change in speed of the vehicle and an acceleration which acts on the vehicle.

12. The electric parking brake control method of claim 9, wherein said estimating the dynamic road surface inclination further comprises:
calculating a reference G value and a variation in the reference G value;
sensing a G sensor value; and
subtracting the sensed G sensor value from the calculated reference G value.

13. The electric parking brake control method of claim 12, wherein said estimating the dynamic road surface inclination further comprises:
removing a high frequency component from a data obtained from said subtracting; and
setting a target braking force based on said data after the high frequency component has been removed.

14. The electric parking brake control method of claim 9, wherein said estimating the dynamic road surface inclination further comprises determining a reference G value over a predetermined time period.

15. The electric parking brake control method of claim 9, wherein said estimating the static road surface inclination further comprises:
initializing a value of a static road surface inclination estimation counter;
storing a current G sensor value;

comparing the current G sensor value with a previously stored G sensor value to determine if a variation between the current G sensor value and the previously stored G sensor value is equal to or smaller than a predetermined value;

determining if there is a forward movement to a vehicle, if the variation is smaller than the predetermined value; and increasing the value of the static road surface inclination estimation counter by an increment, if it is determined the vehicle is stopped, or backed up.

16. The electric parking brake control method of claim 15, wherein said estimating the static road surface inclination further comprises correcting the dynamic road surface inclination, if the static road surface inclination is greater than the dynamic road surface inclination.

17. The electric parking brake control method of claim 16, further comprising setting a target braking force based on the corrected dynamic road surface inclination.

18. An electric parking brake control method for controlling an electric actuator for driving a parking brake, the method comprising:

dynamically estimate a first road surface inclination based on a running state of a vehicle while the vehicle is running;

determining a dynamically estimated target braking force that is a target braking force after the vehicle is stopped, based on the first road surface inclination, statically estimate a second road surface inclination based on an, acceleration acting on the vehicle after the vehicle is stopped;

determining a statically estimated target braking force that is a target braking force after the vehicle is stopped, based on the second road surface inclination;

increasing a braking force of the parking brake to the dynamically estimated target braking force, after the vehicle is stopped; and increasing the braking force of the parking brake to be greater than the dynamically estimated target braking force, if the statically estimated target braking force is greater than the dynamically estimated target braking force, after the vehicle is stopped.

19. The electric parking brake control method according to claim 18, wherein the second road surface inclination is estimated based on an acceleration which acts on the vehicle after the behavior of the vehicle in a pitching direction has converged.

20. The electric parking brake control method according to claim 18, wherein the first road surface inclination is estimated by comparing a change in speed of the vehicle and an acceleration which acts on the vehicle.

* * * * *